United States Patent [19]
Gottlieb et al.

[11] Patent Number: 5,854,834
[45] Date of Patent: Dec. 29, 1998

[54] NETWORK INFORMATION CONCENTRATOR

[75] Inventors: Louis G. Gottlieb; Isaac K. Elliott; Kevin F. James, all of Colorado Springs; Kevin R. Witzman, Monument, all of Colo.

[73] Assignee: MCI Communications Corporation, Washington, D.C.

[21] Appl. No.: 426,256

[22] Filed: Apr. 21, 1995

[51] Int. Cl.⁶ .................... H04M 15/00; H04M 7/00
[52] U.S. Cl. .............. 379/113; 379/112; 379/115; 379/133; 379/219; 379/220
[58] Field of Search .................. 379/1, 13–16, 379/34, 111–115, 133–135, 207, 219, 220

[56] References Cited

U.S. PATENT DOCUMENTS

| | | | |
|---|---|---|---|
| 4,154,983 | 5/1979 | Pedersen . | |
| 4,464,543 | 8/1984 | Kline | 379/135 |
| 4,805,209 | 2/1989 | Baker, Jr. et al. . | |
| 5,003,584 | 3/1991 | Benyacas | 379/135 |
| 5,048,079 | 9/1991 | Harrington et al. . | |
| 5,159,698 | 10/1992 | Harrington | 379/112 |
| 5,233,642 | 8/1993 | Renton . | |
| 5,291,547 | 3/1994 | Boatwright et al. . | |
| 5,311,572 | 5/1994 | Friedes et al. . | |
| 5,313,641 | 5/1994 | Simcoe et al. . | |
| 5,325,290 | 6/1994 | Cauffman et al. . | |
| 5,327,144 | 7/1994 | Stilp et al. . | |
| 5,418,844 | 5/1995 | Morrisey | 379/207 |
| 5,432,865 | 7/1995 | Burd | 379/112 |
| 5,475,746 | 12/1995 | Miller | 379/207 |
| 5,506,893 | 4/1996 | Buscher | 379/114 |
| 5,515,425 | 5/1996 | Penzias | 379/111 |
| 5,515,427 | 5/1996 | Carlsen | 379/220 |
| 5,517,555 | 5/1996 | Amadon | 379/112 |
| 5,574,782 | 11/1996 | Baird | 379/220 |
| 5,592,530 | 1/1997 | Brockman | 379/15 |

*Primary Examiner*—Vijay Shankar

[57] ABSTRACT

A line feed concentrator serves as a network information concentrator having its inputs connected to the outputs of plural adjunct processors. Switches and other network elements are connected to the inputs of a respective adjunct processor. The concentrator compresses data and filters it, thus providing only the type of data required by a specific downstream application. The concentrator incorporates a match/merge subsystem which provides the ability to match/merge network call record files originating at different network elements, but relating to the same call. In essence, the concentrator provides a single point for the call record data from the various network elements thereby facilitating the match/merge function.

17 Claims, 21 Drawing Sheets

NETWORK INFORMATION ARCHITECTURE

FIG. 27

GLOSSARY OF ABBREVIATIONS

| | |
|---|---|
| ADF | Application data field |
| AP | Adjunct Processor |
| API | Application programming interface |
| BDR | Billing data record |
| CDR | Call detail record |
| CR | Call record |
| DAP | Data access point |
| DBMS | Database management system |
| E/P/EP | Extended/private/extended private |
| GSL | Generalized statistics library |
| IPC | Inter-process communication |
| LSE | Local support element |
| MOSR | Matched operator service record |
| NER | NIC event record |
| NIC | Network information concentrator |
| OS level | Operator Service Level |
| OSR | Operator service record |
| SER | Switch event record |

NETWORK INFORMATION CONCENTRATOR

RELATED APPLICATION

The present application relates to co-pending application Ser. No. 08/438,831, filed May 10, 1995, entitled "Network Information Architecture Having Centralizing Storage and Verification Element".

FIELD OF THE INVENTION

The present invention relates to telephone network systems, and more particularly to a consolidated feed for telephone network switches and adjunct processors at various locations, providing a single point for matching billing records, originating at the various switches, and relating to a single call.

BACKGROUND OF THE INVENTION

FIG. 1 is a generalized prior art elementary telecommunications network showing the path between a call originating point, for example, origination phone 6, and the network such as the MCI network, which will be the assumed network for this disclosure. Typically, a call from an origination phone 6 is handled by a local exchange carrier LEC 8. If, for example, an 800 toll-free number is dialed by the origination phone 6, the LEC 8 recognizes that MCI is the carrier for this particular 800 number. Consequently, the call is routed via line 9 to the MCI origination switch 10. This is the entry point of the call into the MCI network, and further routing may be necessary. However, in order to simplify the discussion of the present invention, simply routing through the switch 10 is presumed. Typically, switches of the type discussed are well-known in the art and identified, by way of example, as a DEX 600E switch, manufactured by Digital Switch Corporation, or alternatively a DMS 250 manufactured by Northern Telecom Corporation. International switches are provided by Erikson Limited. The switch 10 has an adjunct processor (AP) 14 associated with it. The purpose of the adjunct processor is to receive call detail records (CDR) from the switch and collect them in buffers. Adjunct processors are of the type manufactured by IBM, and identified as a System 88 processor. Alternatively, a Stratus XA 2000 may be used. Each switch in the network, such as switch 11, has an adjunct processor associated with it.

The call detail records are employed by various applications run by the network. For example, cloned data is provided along line 16 to a billing application 18 which posts the normal billing information for calls made by customers. Additional conventional applications include the acquisition of traffic statistics 24, as well as network management 28. Each of these applications utilizes specific data fields within the CDR data cloned by the involved adjunct processor 14. As will be appreciated, in a complicated network, each adjunct processor must communicate with each application so that the number of outputs from each AP, as well as the total number of inputs to the various applications, becomes unwieldy and difficult to manage from a hardware and software point of view.

Users of the various applications 18, 24 and 28 are schematically indicated by box 22. These may be databases of the MCI network or databases of customers which selectively load data from one or more applications. For example, a large corporate customer (user) may wish to monitor statistics regarding toll-free 800 number calls for whom it is being billed. The traffic statistics application 24 includes such data for the customer which is extracted from the call detail records (CDR) provided by the various adjunct processors in the system.

The conventional data access point (DAP) 32 controls the routing of calls between network switches. The DAP also may block a call if it is unauthorized, or if network conditions warrant such blocking. The DAP is basically a large processor based database that includes customer profile information. The DAP stores call origination information, including such data as origination phone number, time of day a call was made, etc.

BRIEF DESCRIPTION OF THE PRESENT INVENTION

The novelty of the present invention is its ability to match records of a single call from switches or other intelligent network elements at a single point. The end result is to combine billing records from multiple sources into a single record.

The present invention includes a network information concentrator (NIC) which has its inputs connected to the outputs of each adjunct processor. Switches and other network elements, such as the DAP, are connected to the inputs of a respective adjunct processor. The NIC compresses data and filters it, thus providing only the type of data required by a specific application. Thus, the billing application previously mentioned would receive only call record data pertaining to the billing function. The NIC of the present invention incorporates a match/merge subsystem which provides the ability to match/merge call record files originated by different network elements, but relating to the same call. In essence, the NIC provides a single point for the call record data from the various network elements thereby facilitating the match/merge function.

BRIEF DESCRIPTION OF THE FIGURES

The above-mentioned objects and advantages of the present invention will be more clearly understood when considered in conjunction with the accompanying drawings, in which:

FIG. 27 is a glossary of abbreviations included in the following description of the invention.

Figure 1:
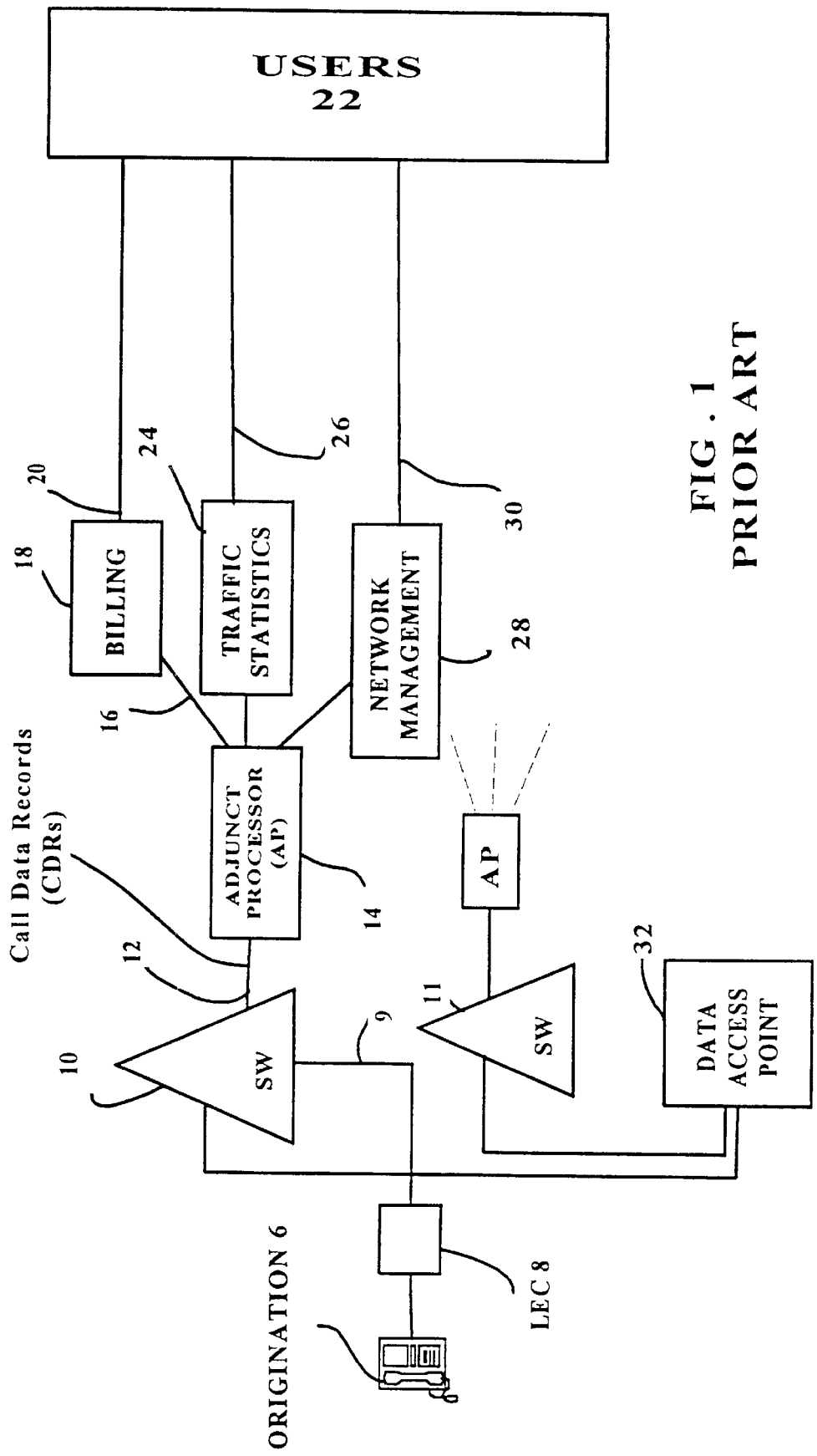
FIG. 1 is a block diagram of prior art network information architecture indicating the connections between an adjunct processor and various data applications.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

DETAILED DESCRIPTION OF THE INVENTION

It is pointed out that FIG. 27 is a glossary of abbreviations used in this description.

Figure 2:
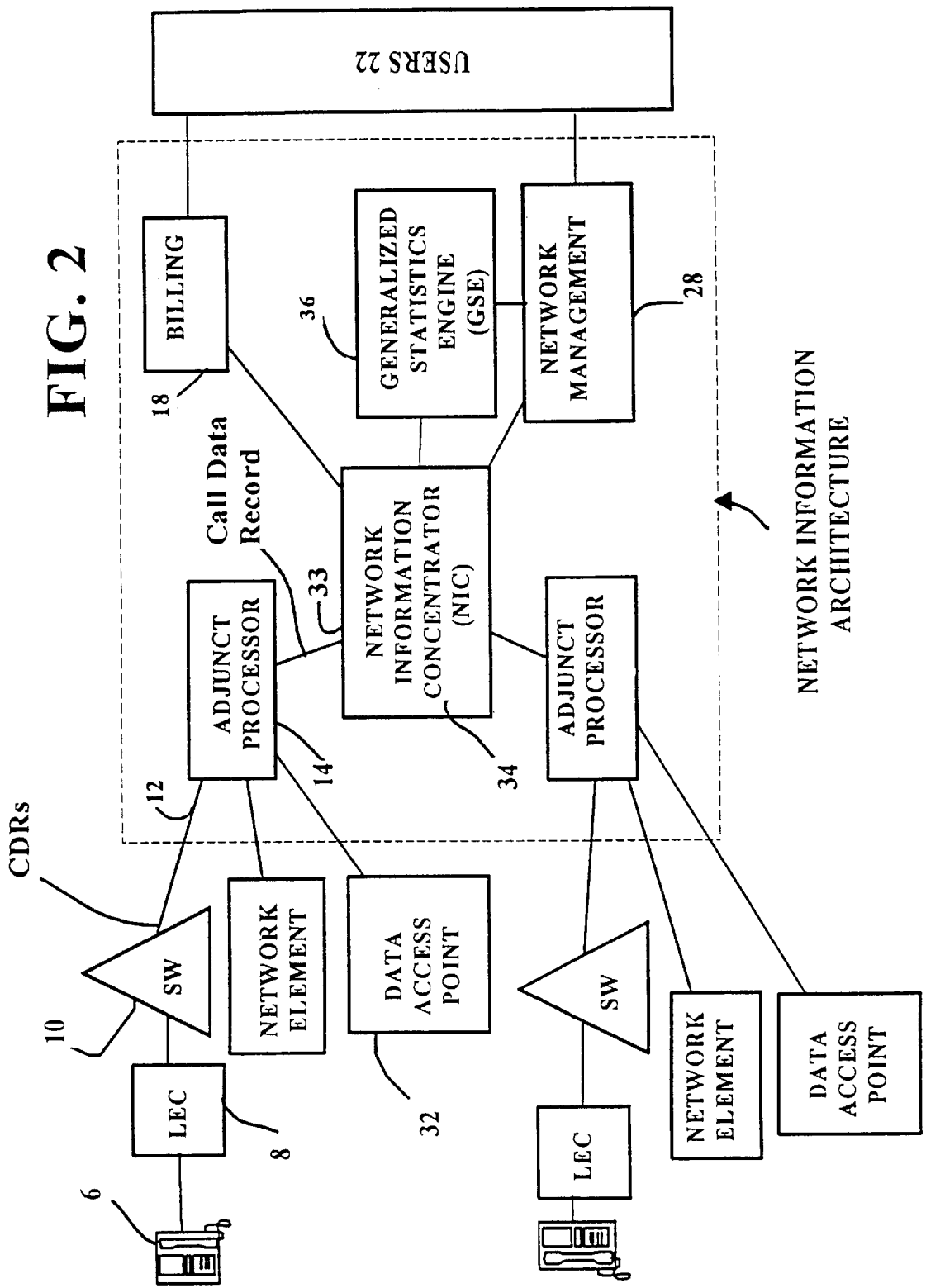
FIG. 2 is a block diagram of improved architecture indicating the inclusion of the inventive network information concentrator between adjunct processors and data applications.

FIG. 2 illustrates the network information architecture which constitutes an improvement of the previously discussed prior art. However, as in the case of the prior art, an originating point, for example phone 6, communicates via a local exchange carrier LEC 8 to the network. As in the prior art, if an 800 toll-free number is dialed by the origination phone 6, the LEC 8 recognizes the network to handle the call, for example, MCI. As a result, the call is routed to an MCI origination switch 10. This is the entry point of the call into the MCI system, and further routing is normally required. As in the case of the prior art, a data access point 32 provides this function. In fact, a number of switches and other network elements feed data to a corresponding adjunct processor 14 which stores and distributes the data to the network information concentrator (NIC), as discussed hereinafter. Other types of network elements may include an enhanced voice services platform or an intelligent services network platform. The latter subject is discussed in an article by Richard Robrock entitled "The Intelligent Network— Changing the Face of Communications" published in the *Proceedings of the I.E.E.E.,* Vol. 79, No. 1, January 1991.

The output of each adjunct processor 14 is connected to an input of a distributed group of processors constituting the network information concentrator. The purpose of the concentrator is to compress and filter data supplied thereto, on an applications basis. By that it is meant that the concentrator 34 selects certain types of data fields from all of the data supplied to it, as required by a particular application, which may then be employed by a user (customer). As will be observed from FIG. 2, a single point of access to the applications is provided to transfer data from all network elements served. For the most part, the data format for the various applications is uniform so that the NIC 34 deals with standardized communications for the applications.

Figure 3:
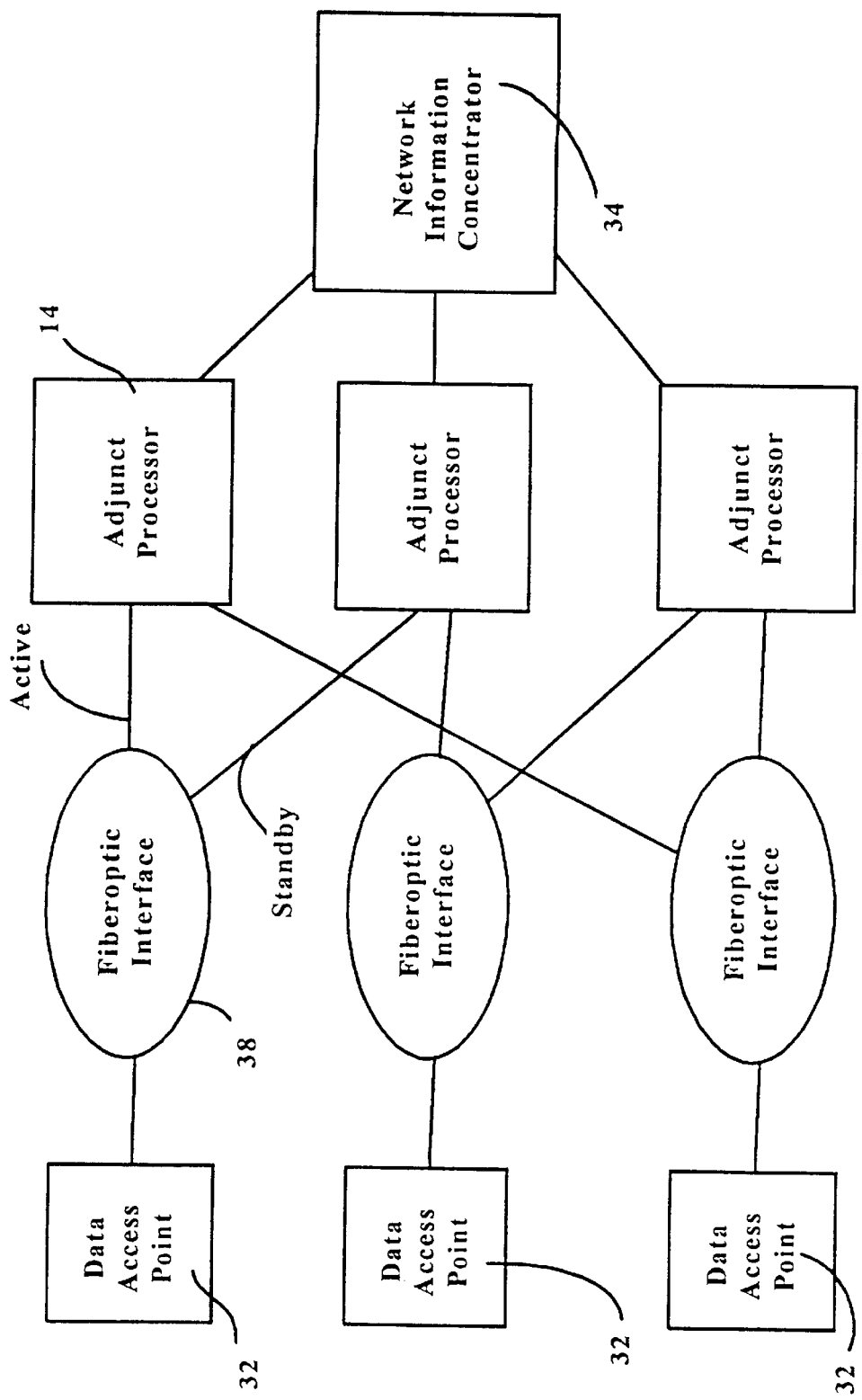
FIG. 3 is a block diagram showing the inclusion of a fiber optic interface between data access points and adjunct processors.

FIG. 3 illustrates in greater detail a typical connection between several data access points 32 and adjunct processors 14 at the front end of the network information concentrator. More particularly, in the example of three APs, the output of each DAP 32 is seen to communicate, via a fiber optic interface 38, with two APs. The first communication link is active, while the second provides a redundant standby path in case the first link is disabled.

Figure 4:
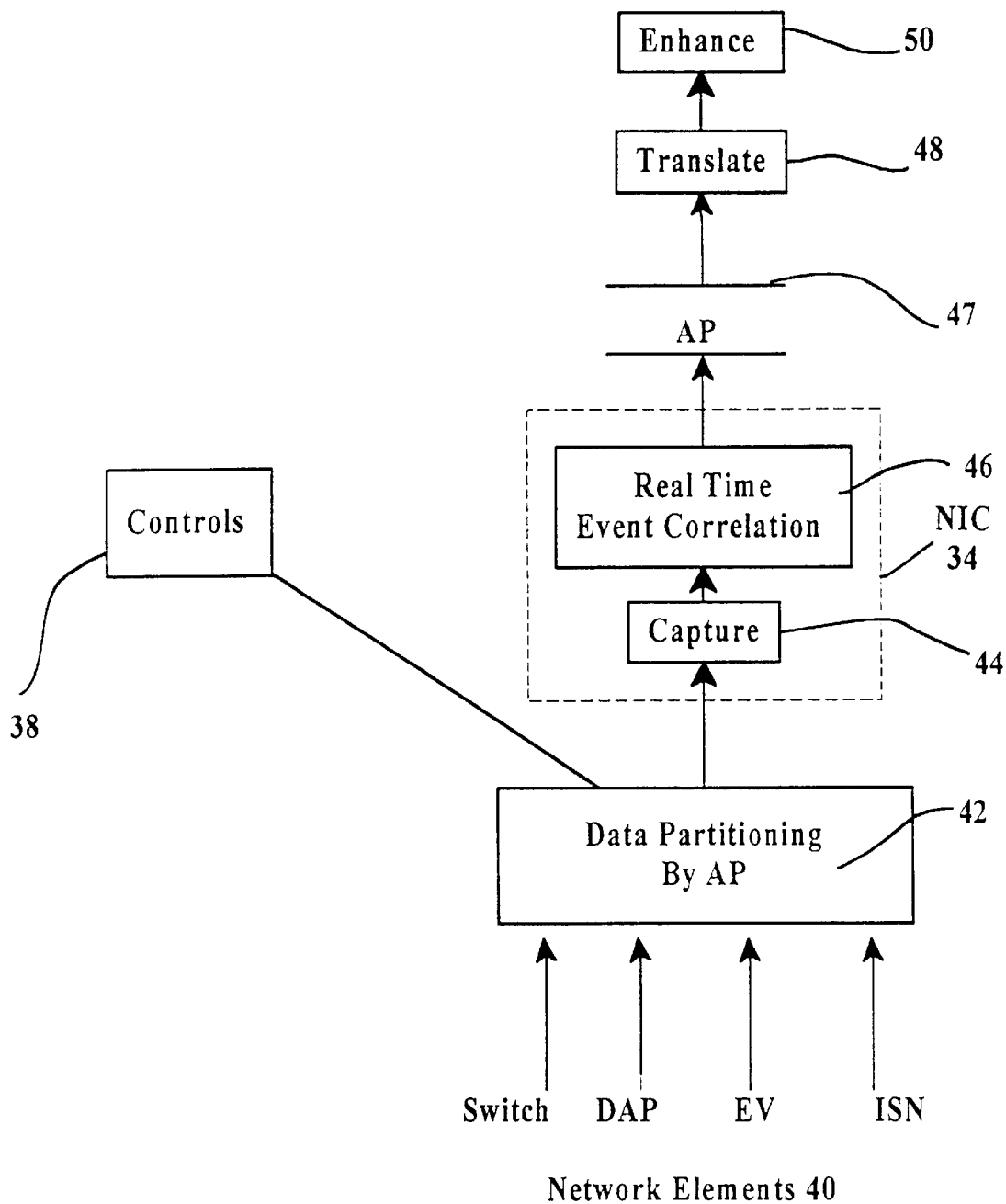
FIG. 4 is a functional block diagram indicating the partitioning of data from network elements.

FIG. 4 represents a functional block diagram of the basic network information architecture. The lower portion of the Fig. includes data from various types of network elements generally indicated by reference numeral 40. They may include a network switch, such as switch 10, a DAP 32, an enhanced voice systems (EVS) platform, or an intelligent services network (ISN) platform. The data partitioning function 42 involves the collecting of data elements from network elements on a call-by-call basis. A particular call is tagged by the network via a customary network call ID tag, which is carried along to each involved network element for the call. Accordingly, the data partitioning function occurs on the call level, and collected data elements undergo hard point data storage. Function 42 is carried out by each adjunct processor 14.

A succeeding data capture step occurs at 44. The function is actually carried out within the NIC 34. The real time event correlation function 46 ensures that data being partitioned is neither lost nor duplicated. Reference numeral 47 represents an application program interface (API) for users which enable them to acquire raw network data from the various network elements in the network. End customers may require such raw network data.

Functional steps 48 and 50 represent additional services which may be offered to a customer who has acquired raw data. Namely, translation of the data to different formats is indicated by function 48, while an enhanced data function 50 is indicated. Enhancement may be the combining of various types of data to obtain new results, as desired by the customer. Such enhanced data would, of course, require communication to customers by means of a further application program interface (API). It should be mentioned that the APIs envisioned are of the type customarily used in communication protocols.

The indicated controls function 38 controls data sequencing, gap-duplication deletion, and re-transmission of lost data. The controls function operates upon call detail records (CDRs) that are generated by a switch or other network element 40. All such records have a sequence number written called the call disconnect identifier (CDID). These CDRs are bundled into blocks of records, typically 31 in number, with at least one "end of block" switch event record (SER). The blocks are transmitted from the switch or network element thereby making such element a data source to the adjunct processor data partitioning function 42. At this point, the AP takes on the role of being both the hard point and the data continuity detector. In order to ensure data integrity, the blocks are "deblocked" and the CDIDs of the CDRs are analyzed for sequential integrity. That is, the verification that no CDIDs are duplicated or missing. As these sequence numbers are validated, they are "reblocked" as received and are assigned a new block sequence number and sent downstream to NIC 34. The NIC is now a data receiver, and, as such, it monitors the data stream being received, assuring that all data is received in order. If any anomalies are identified within the CDIDs, the NIC sends a message to an appropriate AP identifying the problem, while a request for retransmission is sent to the switch or network element for the missing or questionable data. This is explained in greater detail hereinafter, in connection with the detailed function diagrams of the NIC.

Figure 5:
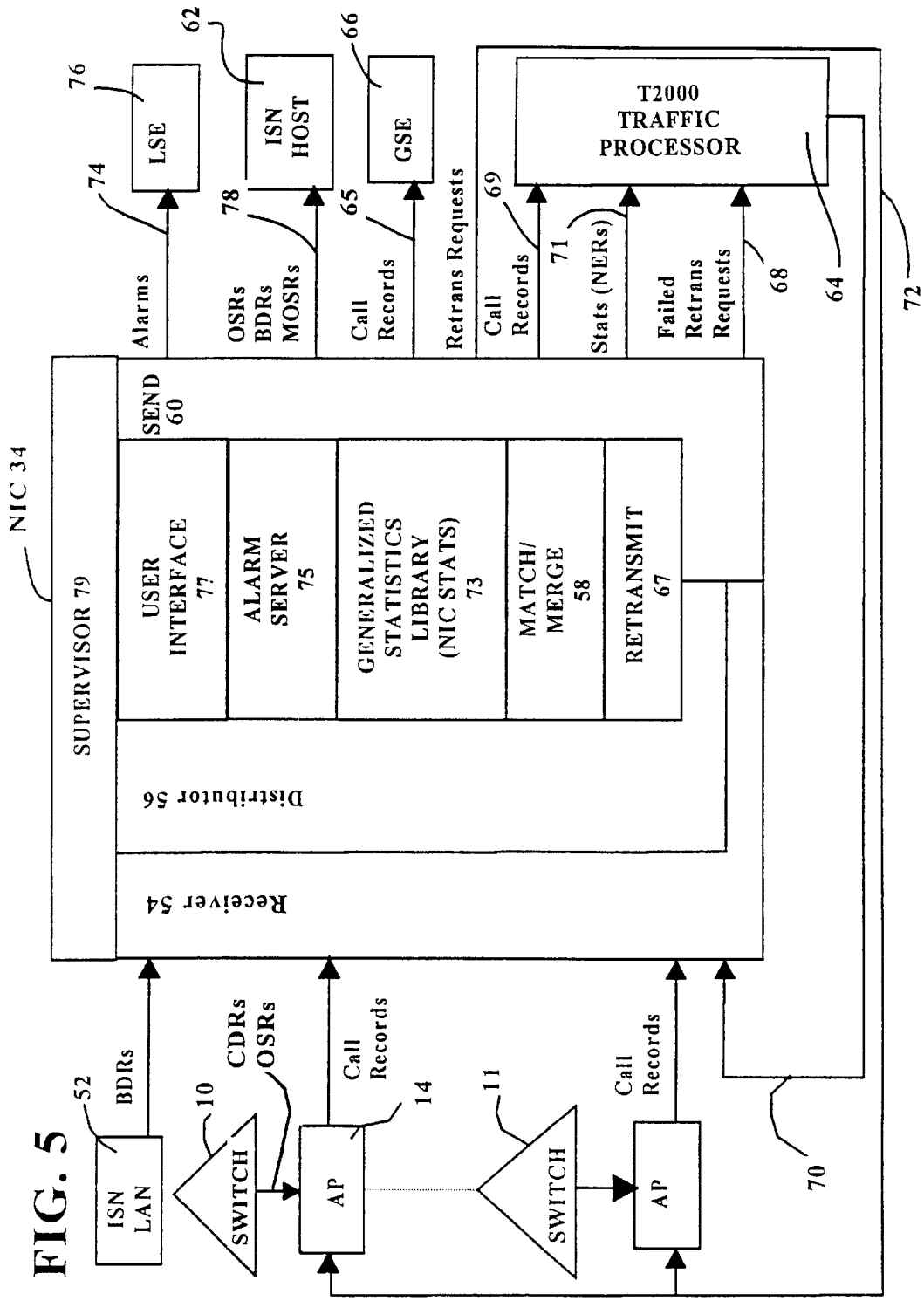
FIG. 5 is a block diagram illustrating, in greater detail, the various functions of the network information concentrator.

FIG. 5 is a block diagram of the architecture which shows the NIC 34 in greater detail. Although the NIC is shown as a single functional unit, it is, in fact, a distributed processor, such as a cluster of IBM RS 6000 units—Model R24. Specifics concerning the various sections of the NIC are treated hereinafter, with reference to FIGS. 7 et seq. The NIC 34 collects a call record data from the adjunct processors (AP 14), as previously indicated in connection with FIG. 2. The call record data is obtained from the network which is involved in the path of a call. The AP call records are input to a receiver section 54 of the NIC.

The switch 10 is one type of network element. Another typical type of network element is intelligent services network (ISN) 52, which generates billing data records (BDRs) that are directly input to the receiver section 54 of NIC 34. The receiver section provides the necessary handshaking signals with the various network elements to effect data input to the NIC. The succeeding NIC section, namely the distributor 56, identifies the type of record being processed. In addition to the BDRs of ISN 52, call detail records (CDRs) or a subset thereof, namely, operator service records (OSRs), may be processed.

A processor 58 of the NIC performs a match/merge operation of BDRs and OSRs generated by network elements. As a result, when a particular call is handled by various elements in the network, the call records are merged by the match/merge 58 so that they may be forwarded as a matched OSR, now referred to as a MOSR, to an intelligent services network (ISN) host 62. The ISN host corresponds to the billing function previously discussed in connection with FIGS. 1 and 2. In order to complete a communication path between the match/merge section 58 and the ISN host 62, a send section 60 of the NIC 34 communicates call records (OSR, BDR, and MOSR) to the ISN host 62 via line 78.

Call records are also sent from the NIC 34 to a generalized statistics engine (GSE) 66 which produces statistical counts of a pre-selected nature, on the call records. Such a statistics engine is the subject matter of Applicants copending application Ser. No. 08/438,918. A communications line between the send section 60 of the NIC and the input of the GSE is indicated by reference numeral 65.

A traffic processor 64 is provided so that all call record data may be collected thereat. In the event the traffic processor 64 detects missing call record data, it generates a re-transmission request along line 70. The request is received at the receiver section 54 of the NIC 34, which will re-transmit the requested call record data, if it is present in the NIC. Otherwise, the NIC 34 generates the corresponding re-transmission request along line 72, which is fed back to the adjunct processors which store past call record data. Upon receipt of such a re-transmission request by the AP, it re-transmits the requested missing call record data to the receiver section 54 of NIC 34. The re-transmission of requested missing call records is handled through the re-transmit section 67 of the NIC 34. All call record data is received by the traffic processor 64 from the send section of the NIC 34, via line 69. The traffic processor also receives statistics concerning NIC event records (NERs). These are provided by the statistics library section 73 of the NIC that receives specific call records from the APs. In the event that the requested missing call record data is unavailable by either the NIC or the APs, a failed re-transmission request signal is generated on line 68 of the traffic processor.

An alarm server 75 monitors the operation of the adjunct processors and the network elements. In the event of a malfunction or alarm condition, an appropriate signal is sent to the network management platform (LSE 76), which is comparable to the network management function 28 indicated in the prior art network of FIG. 1.

The timing for all communication between the network elements, the NIC sections, and the platforms and processors connected to the NIC output are handled by the distributed processor supervisor section 79 of the NIC 34.

Figure 6:
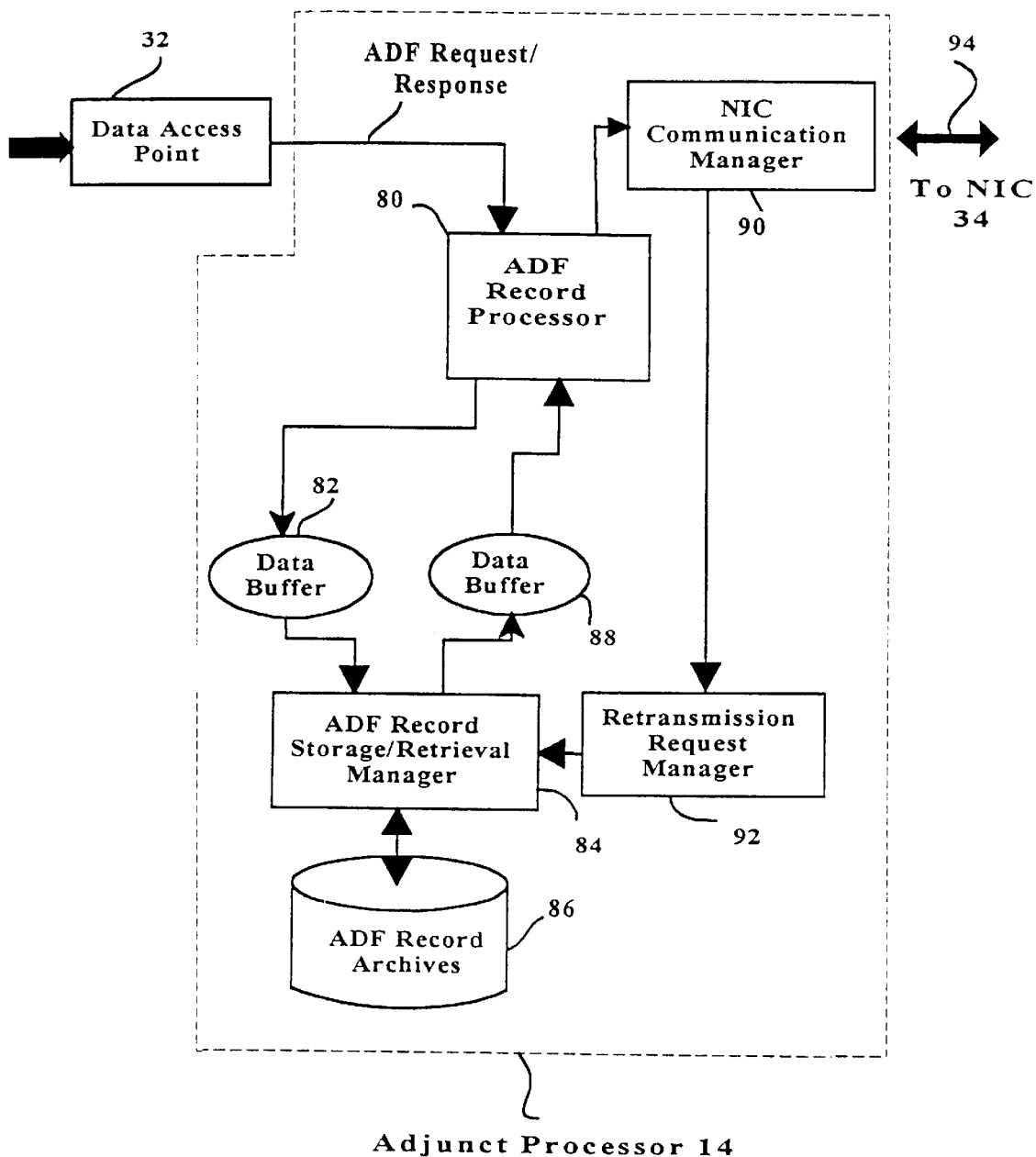
FIG. 6 is a flowchart of an adjunct processor as employed in the present invention.

FIG. 6 is a more detailed description of the connection between a data access point (DAP) 32 and an adjunct processor (AP) 14 for accepting re-transmission requests and servicing them. Network elements generate ADF (application data format) requests to a DAP for routing information of a call. The DAP responds with an ADF response. If the traffic processor 64 in FIG. 5 generates a re-transmission request on line 70, the NIC 34 responds to this request by signalling the NIC communication manager 90 of the adjunct processor 14. With continued reference to FIG. 6, the ADF record flow will now be summarized.

The data access point 32 feeds data to the ADF record processor 80 of the adjunct processor 14. The data then undergoes buffering in data buffer 82 until it can be handled by a storage/retrieval manager 84. The manager stores the records on a hard drive (ADF record archives) 86.

When the NIC regenerates a re-transmission request to the AP communication manager 90, the request is transferred to a re-transmission request manager 92, which signals the storage/retrieval manager 84 that re-transmission of a record is necessary. The manager 84 then accesses the hard disk archives 86 and the record is transferred, via the manager 84, to an output data buffer 88. From the buffer, the ADF record processor 80 transfers the record to the communication manager 90 where it is output to the NIC 34, along line 94.

Receiver Subsystem
Data Flow for the Receiver Subsystem

Figure 7:
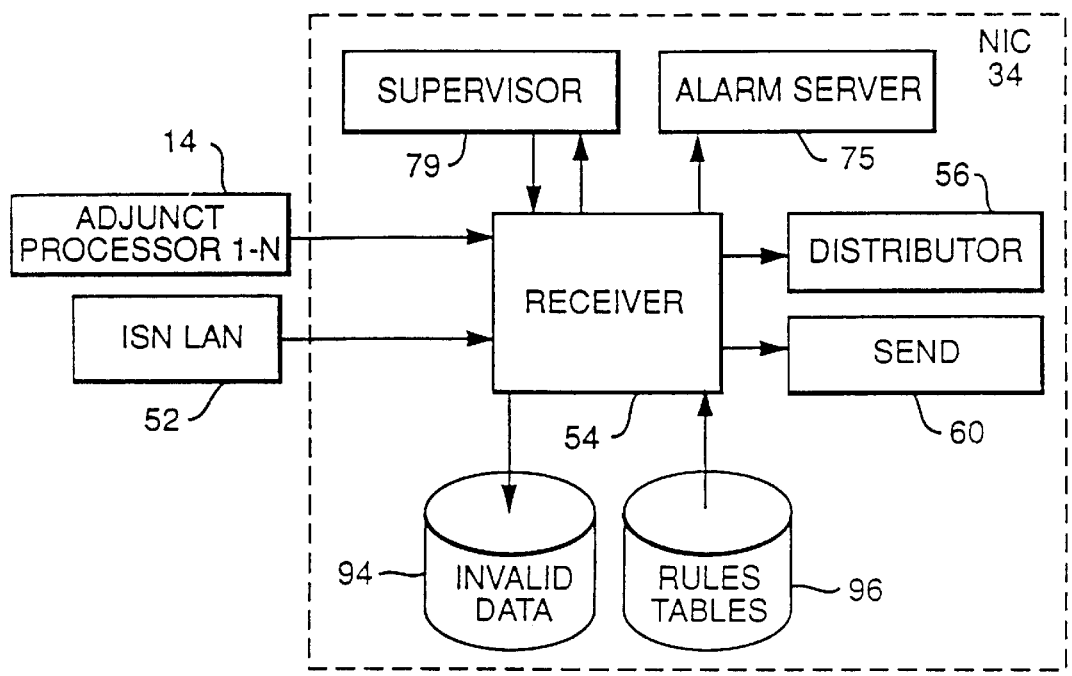
FIG. 7 is a data flow diagram for the receiver subsystem of the NIC.

FIG. 7 is a data flow diagram for the receiver subsystem. The receiver subsystem is responsible for accepting connection/transmission/rejection requests and data from external clients and providing a consolidated feed to internal clients. Reference numeral 14 indicates an adjunct processor. The feed between the adjunct processor 14 and the receiver subsystem primarily contains call records produced at the various switch sites. Adjunct processors that initiate a connection to the NIC are required to pass a registration message once a physical connection is established. This connection also receives retransmission rejection messages and retransmission data from the APs.

In addition to adjunct processors, another type of network element is an intelligent services network ISN LAN 52. This network element feeds billing data records (BDRs) from servers on the ISN LAN to an input of the receiver. Such servers pass a registration message to the receiver 54 once a physical connection is established between them. From the registration information provided the receiver from the network elements, it may validate the information thereby permitting call completion.

A number of subsystems are shown within the dotted block of NIC 34, and these are indicated by four rectangular blocks. These four subsystems are to be individually discussed hereinafter. However, like the receiver, subsystems are processes formed by a cluster of digital processors, such as four RS 6000 processors manufactured by IBM and denoted as a Model R24 cluster. The first of the receiver related subsystems includes the supervisor 79 which stores registration information from the receiver. In case of retransmission requests, the supervisor knows which adjunct processor is involved. In the case of the output from the supervisor 79, this connection provides an input shutdown message to the receiver subsystem. The receiver will then finish vital internal functions and then shut itself down. In the case of the input to the supervisor, an internal feed is indicated which contains the registration and deregistration messages received from all NIC external clients. The supervisor will accept and hold this information and provide it to internal clients.

The alarm server 75 receives alarm messages generated by the receiver subsystem, and these may be related to various errors detected by the receiver. Invalid data 94 may be stored on disk and represents data that cannot be processed upon receipt by the receiver subsystem. The rules table 96 represents a hard disk output to the receiver 54 containing the receiver's rules of operation, initial configuration data, thresholding information, and subsystem control information. These rules are table driven, and read into memory from the receiver's rules files at subsystem startup.

The distributor subsystem 56 is fed data from the receiver which corresponds to a consolidated feed of all AP call records, transmitted call records, and ISN BDR records. The send subsystem 60 receives data from the receiver 54 and contains reject messages from the APs.

Process Flow for the Receiver Subsystem

Figure 15:
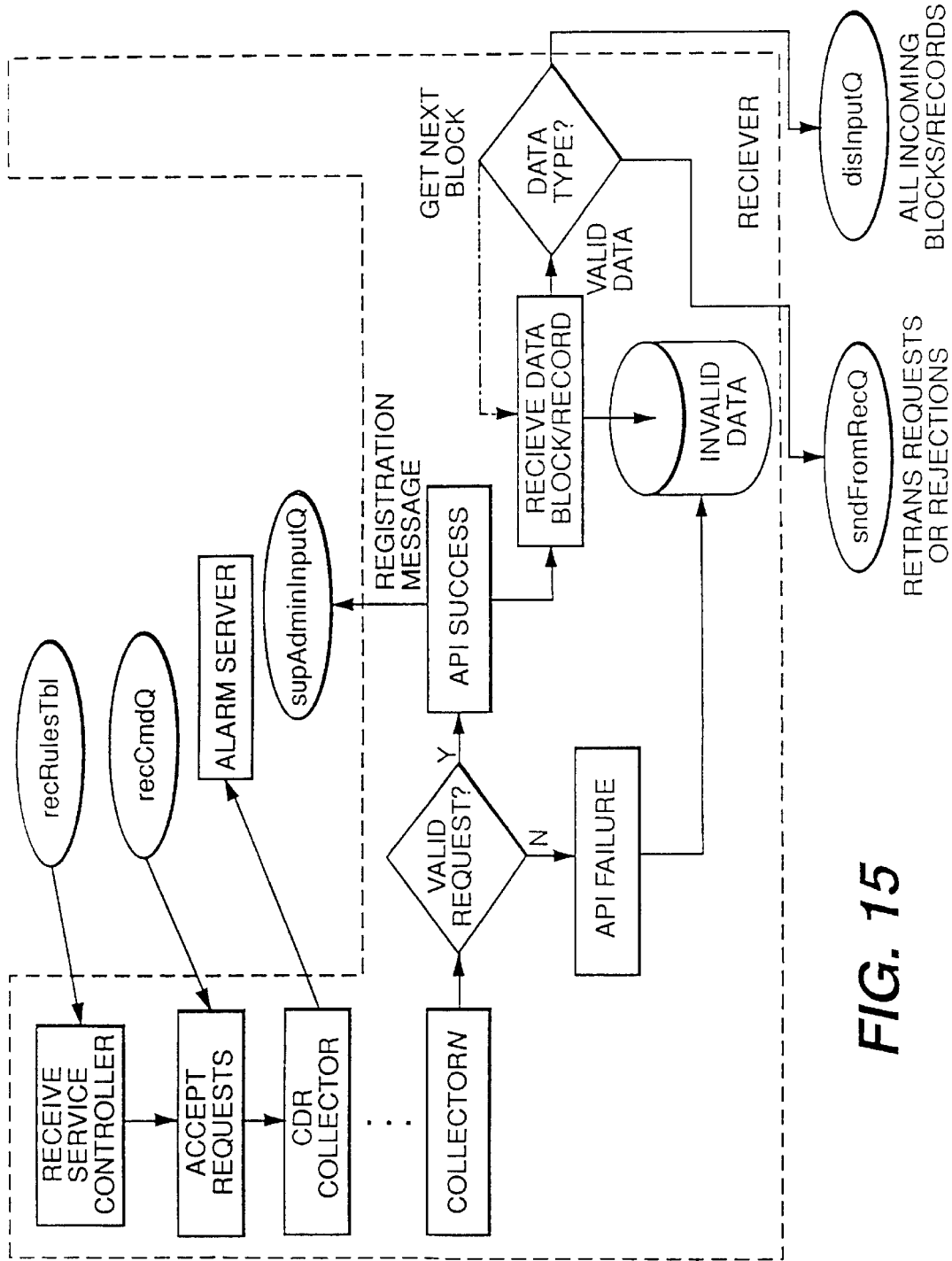
FIG. 15 is a process flow diagram for a receiver subsystem of the NIC.

FIG. 15 represents a process flow diagram for the receiver subsystem. The receiver subsystem is responsible for accepting connection, retransmission, and rejection requests as well as data from external clients and providing a consolidated feed to internal clients. This process only looks at common and client specific application program interface (API) headers it receives to determine the appropriate internal client queue.

The Receive Service Controller function of the receiver subsystem will be started by the supervisor and will run until requested to shutdown. This routine is responsible for performing all the administrative startup and initialization functions of the receiver. If a terminal error is encountered during subsystem startup, an alert is logged and the routine will shut itself down. Fatal errors such as no configuration files, or an unsuccessful attempt to attach to interprocess queues, will generate a critical alarm to the alarm server. The receiver will then shut itself down.

The Accept Requests routine will be executed continuously or until the supervisor requests it to stop. It will be responsible for listening to a UNIX or well-known port for requests to connect to the NIC service. It is this routine's function to accept all incoming connections and start a collector process to manage that connection. After the collector is started, the Accept Request routine will have no other dealings with that specific connection.

It is important to note that no connections are refused by this routine (i.e., no connections are actually accepted on the well-known NIC port). If this routine were to refuse a connection, and the client does not detect the denial, the NIC well-known port would be unavailable to other clients for a time-out period. By having the collector accept all connections and determine platform compliance, it is ensured that an incoming port is always available to accept new connection requests.

The collector processes started by this routine will function as long as the client continues to transmit data. If a service wants to shut down a receiver process, it will inform this routine and the appropriate collector will be notified. The Accept Requests routine will notify collector processes of a shutdown request and wait for them to stop themselves. If the collectors have not stopped after a time-out period, this routine will force them to shutdown and then stop itself.

The CDR Collector processes are started by the Accept Requests routine. They are responsible for receiving data off a dedicated incoming communications port and sending it on to either the distributor or sender input queue. Collectors will be started and pass the connection information from the client. The collector then accepts the connection requests on its own port (not the well-known port the receiver Accept Requests routine listens to). The connection is then complete and the collector can accept information from the client.

In the Valid Request step, the client is required to send a connection registration message to the NIC once the physical connection is established. If the collector process determines the message conforms to the specification, a confirmation message is returned to the client by the API Success routine. Messages that do not conform to the message format are sent to the AP Failure routine to process a rejection message.

Through the API Success routine the collector process will send a positive registration message to a client that sends a valid registration message. Once the client receives this message, they may begin transmitting data to the collector process. At this point, the collector sends the entire registration message up to the supervisor.

Through the API Failure routine, the collector process will send a registration message to a client that sends an invalid registration message. The receiver collector process will then close the connection it received the registration message on, log the alert to the alarm server, and terminate itself.

During the Receive Data Block/Record routine, the collector process will then read the common API header off the incoming connection and determine what the clients' API should look like. If the received header does not conform to the pre-determined specification, the block is considered invalid and the contents will be sent to the invalid data file. The common API header describes how much information is contained in the following structure. The entire structure is read off the incoming connection before continuing to the next step.

When the collector process reaches the Data Type step, the client specific header and data structure have been received and the application now needs to decide whether the data is a retransmission/rejection message for the send subsystem or a normal/transmission block for the distributor subsystem. If the retransmission bit exists in the API structure for this data structure and it is set to true, the data is either a retransmission/rejection message or retransmitted call records from the adjunct processor. Non-data blocks with this bit set are only sent to the send subsystem's input queue. All other data received are sent to the distributor subsystem's input queue.

Distributor Subsystem
Data Flow for the Distributor Subsystem

Figure 8:
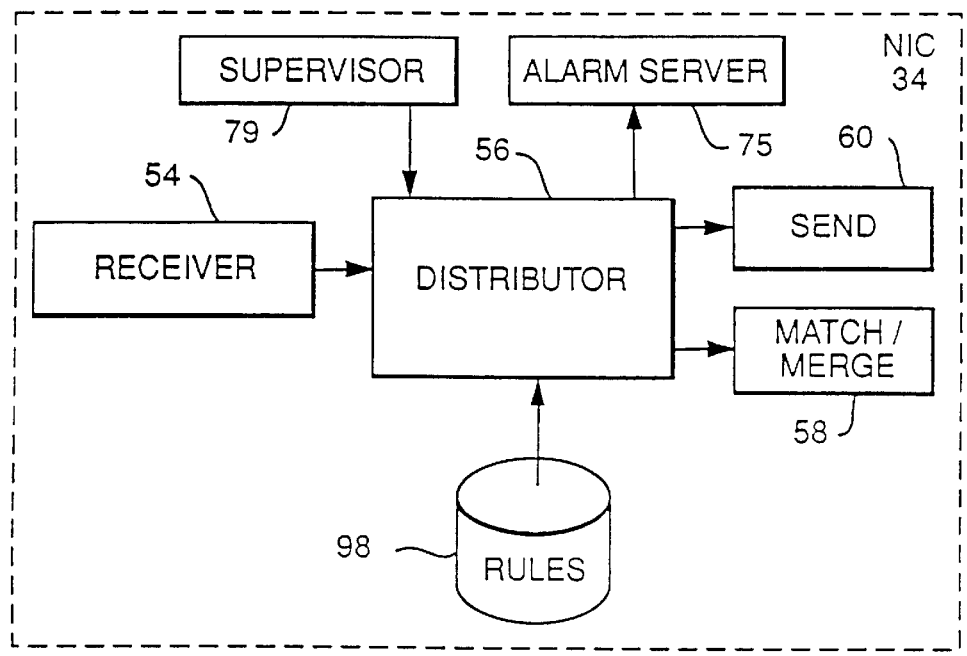
FIG. 8 is a data flow diagram for the distributor subsystem of the NIC.

FIG. 8 illustrates a data flow diagram for the distributor subsystem. Contiguous blocks of call record (CR) data are passed from the receiver subsystem to the distributor subsystem. Rules tables, as in the case of other subsystems of the present invention, are table driven processes, in this case governing the distributor subsystem. Rules will be written to memory from rules files stored on a hard disk 98. There is one distribution rule file for each set of client-based filtering criteria. Each of the table files contains a list of record classifications to be routed to a particular client. There is also a general rule file containing configuration information.

The supervisor subsystem output consists only of shutdown requests. Appropriate CRs and BDRs will be sent to the match/merge subsystem 58. Appropriate data for the generalized statistics engine (GSE, FIG. 5), the ISN (FIG. 7) and the traffic processor (T2000) 64 (FIG. 5) are sent to the send subsystem. All alarms generated by the distributor subsystem will be sent to the alarm server.

Process Flow for the Distributor Subsystem

Figure 16:
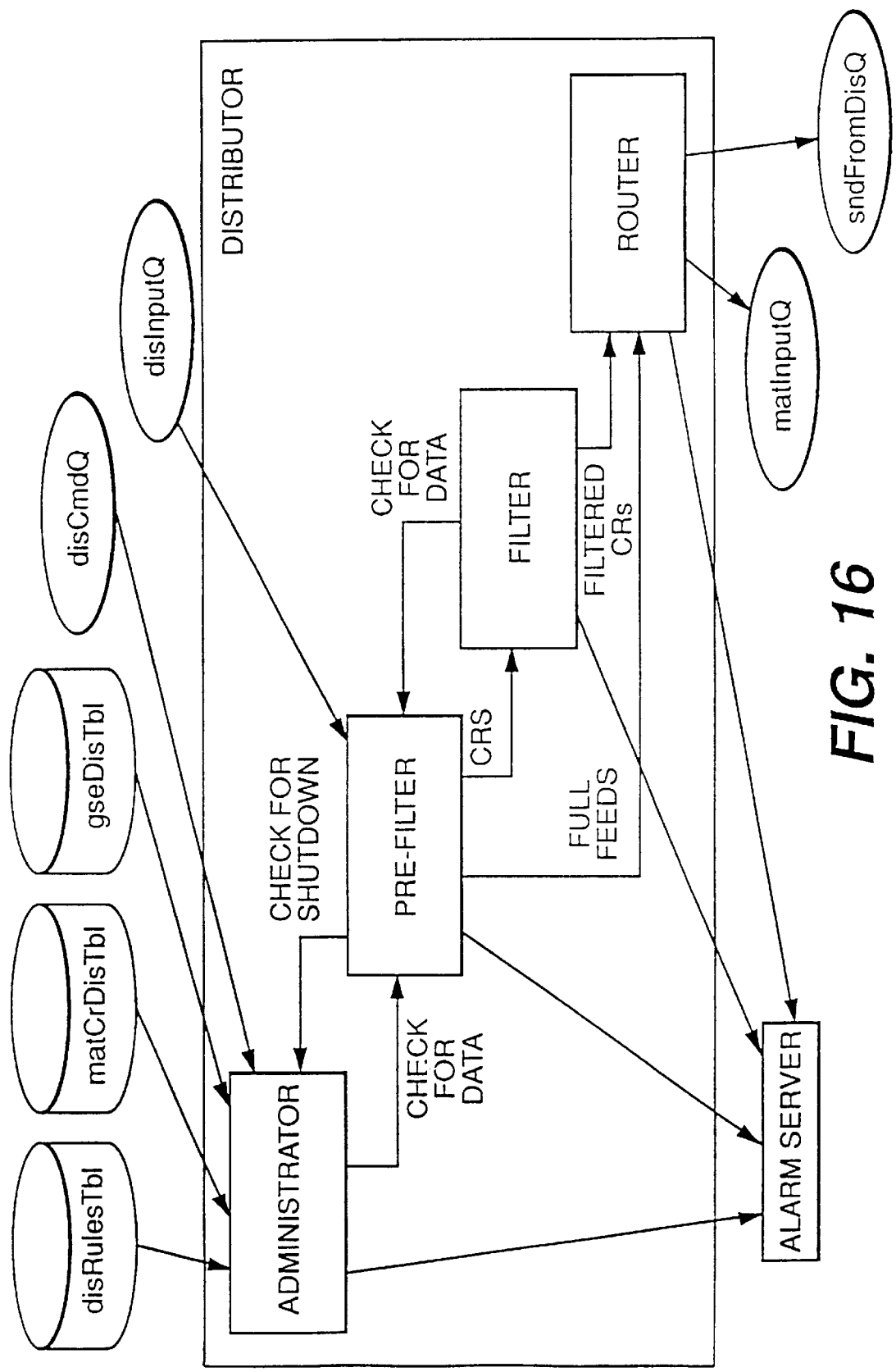
FIG. 16 is a process flow diagram for a distributor subsystem of the NIC.

Referring to FIG. 16, the Administrator module is responsible for the initialization and shutdown of the distributor subsystem. The administrator will first read all appropriate tables into memory. These tables will include disRulesTbl, matCrDisTbl, and gseDisTbl. The disRulesTbl table will contain all configurable information including threshold information and host distribution table names. The matCrDisTbl client-based distribution table will define all CR classifications that will be sent to the match/merge subsystem. The gseDisTbl client-based distribution table will define all CR classifications that will be sent to the send subsystem for the GSE client. The administrator will call the DisReadTable module to read in a set of client-based record classifications from a distribution table.

Next the administrator will connect to the disCmdQ, disInputQ, matInputQ, and sndFromDisQ queues. The disCmdQ queue is the command queue for the supervisor subsystem to notify the distributor subsystem to shutdown. The disInputQ queue is the data queue for the receiver subsystem to feed data records to the distributor subsystem. The matInputQ queue is the CR and BDR feed to the match/merge subsystem. The sndFromDisQ queue is the data feed to the send subsystem from the distributor subsystem. After connecting to these queues, the administrator will attempt to read a message from the supervisor command queue disCmdQ. If there is no command message, the administrator will process it appropriately at that time. In a simplified version of the system, the only command messages expected by the distributor subsystem are shutdown requests. There will be two types of shutdown requests for the distributor subsystem, hard and soft. In the event of a soft shutdown request, the distributor will finish processing all data stored in volatile memory, compile a shutdown alarm, and send the alarm to the alarm server, and then shutdown. In the event of a hard shutdown request, the distributor will compile a shutdown alarm, send the alarm to the alarm server, and then shutdown. If there is no command message from the supervisor subsystem, the administrator will call the pre-filter to process incoming records.

The Pre-Filter module is called by the distributor administrator to process record data. The pre-filter will first initiate a timer to designate when to return control to the administrator to check for a supervisor command message in the disCmdQ queue. This timer will be set to a configurable time. This timer will be checked before reading each message from the disInputQ queue. If the specified time has elapsed, then the pre-filter will return control to the administrator.

If the timer has not elapsed, then the pre-filter will attempt to read a message from the disInputQ queue. This queue is the main data feed from the receiver subsystem to the distributor subsystem. If there is no message in disInputQ queue, then the message type and data type fields in the API will be examined. If the message type indicated retransmitted data, then the pre-filter will ensure that the retransmitted data block is sent to all of the clients who want a full feed of all retransmitted data. In a simplified version of the system, the T2000 host 64 (FIG. 5) will be the only requestor/receiver of retransmitted data from the NIC.

If the data type indicates that the message contains BDR data and the message type was not retransmission, then the pre-filter will ensure that the data block is sent to all clients that want a full feed of BDR data. The match/merge and send (for ISN) subsystems are the only clients for BDRs in a simplified version of the system. Otherwise, if the data type indicated that the message contained CR data and the message type was not retransmission, then the pre-filter will ensure that the data block is sent to all clients that want a full feed of CR data. The send subsystem (for transmission to the T2000 64) is the only client for a full feed of CR data in a simplified version of the system. Also, if the data type had indicated that the message contained CR data and the message type was not retransmission, the pre-filter will call the filter to compile filtered feeds from the data block. The match/merge and send (for GSE) subsystems are the only clients for filtered CR data in a simplified version of the system. If the data type was not recognized, then the data will be written to an appropriate file and an alarm will be constructed and sent to the alarm server.

The Filter module is called by the distributor pre-filter when CR data needs to be broken down into filtered feeds. CR data marked as retransmission data will not be broken into filtered feeds in a simplified version of the system. Match/merge and GSE will be the only recipients of filtered record feeds in a simplified version of the system. Once the filter receives a block of CRs from the pre-filter, it will reference the client-based distribution tables in memory to classify match/merge and GSE records.

For each record in the data block, it will traverse the match/merge distribution table, attempting to classify the given record. The filter will traverse the table until a match is made, or the end of the table is reached. If a match is made, then that particular record will be added to the match/merge filtered data block. The next record in the original data block is compared with the entries in the match/merge table. This continues until a match/merge classification has been attempted for every record in the original data block. Next, the router will be called to send the constructed block to the match/merge subsystem.

For each record in the data block, the filter will traverse the GSE distribution table, attempting to classify the given record. If a match is made, then that particular record will be added to the GSE filtered data block. This continues until a GSE classification has been attempted for every record in the original data block. Lastly, the router will be called to send the constructed block to the GSE subsystem.

Classifications using the distribution tables will be accomplished by referencing a nibble and listing the values it should have. For each classification in the distribution tables, there will be one or more criteria, and then an end flag. Each criteria will contain a nibble offset, and a 16-bit field mapping out the desired values for that particular nibble. If a record satisfies all of the criteria in a given classification, then that record will be sent to the appropriate client.

The Router module is called by other modules in the distributor subsystem. The calls to router must pass a destination and a data block. The pre-filter may send full feeds to match/merge, ISN, and T2000 64 (FIG. 5) by passing the data block to the router, and designating match/merge, ISN, or T2000 64 as the destination. Filter may send filtered records to match/merge and GSE by passing the partial data blocks to router and designating match/merge or GSE as the destination. The router will populate API fields appropriately before sending the data. This may require traversing through a data block to get a record count. If the router encounters a problem, it may compile its own alarm message and send it to the Alarm Server.

Alarm Server Subsystem
Data Flow for the Alarm Server Subsystem

Figure 9:
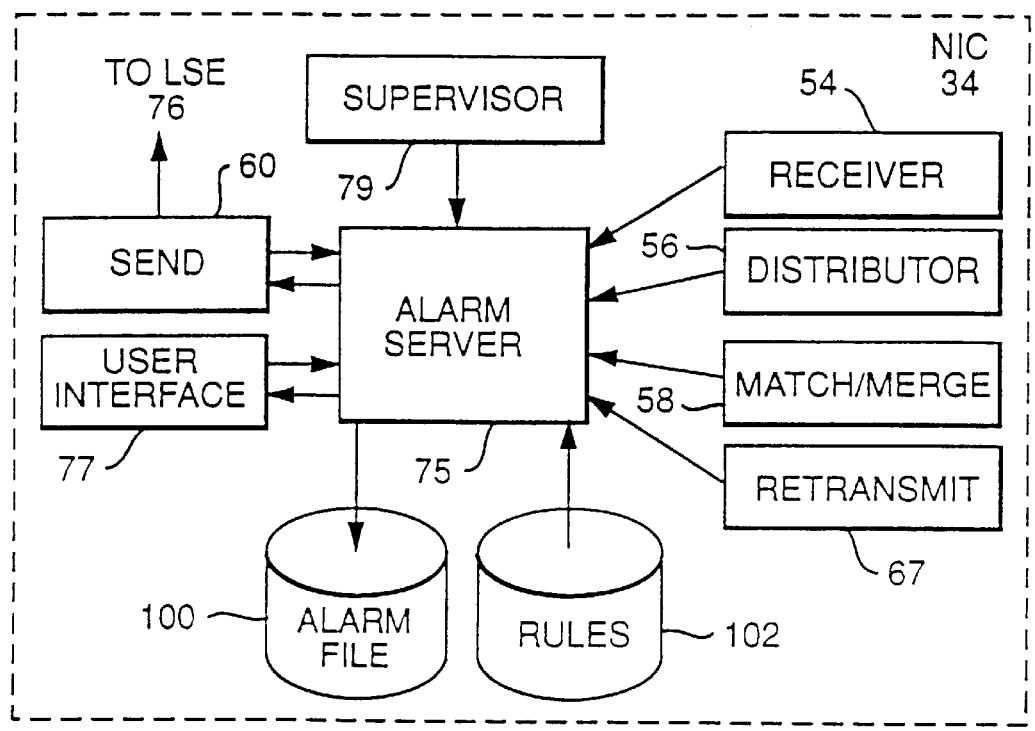
FIG. 9 is a data flow diagram for the alarm server subsystem of the NIC.

FIG. 9 illustrates a data flow diagram for the alarm server 75. Alarm messages from all NIC subsystems are sent to the alarm server which writes these alarms to an alarm file on hard disk. The engine for the alarm server may be an AIX SNMP service, and IBM product NetView/6000. Rules for the alarm server subsystems (such as how alarms are processed) are read from storage 102 at subsystem initialization. These rules may be implemented as filters in the engine. The user interface 77 may receive alarm messages with designated severity for immediate notification at an operator terminal display. An alarm file 100 contains all the alarm messages on a hard disk. Selected alarms with specific classification are sent to the send subsystem 60. The alarms may be selected based upon filtering criteria set in the filters of the engine. The output of the send subsystem goes to LES 76 of FIG. 5.

Match/Merge Subsystem
Data Flow for the Match/Merge Subsystem

Figure 10:
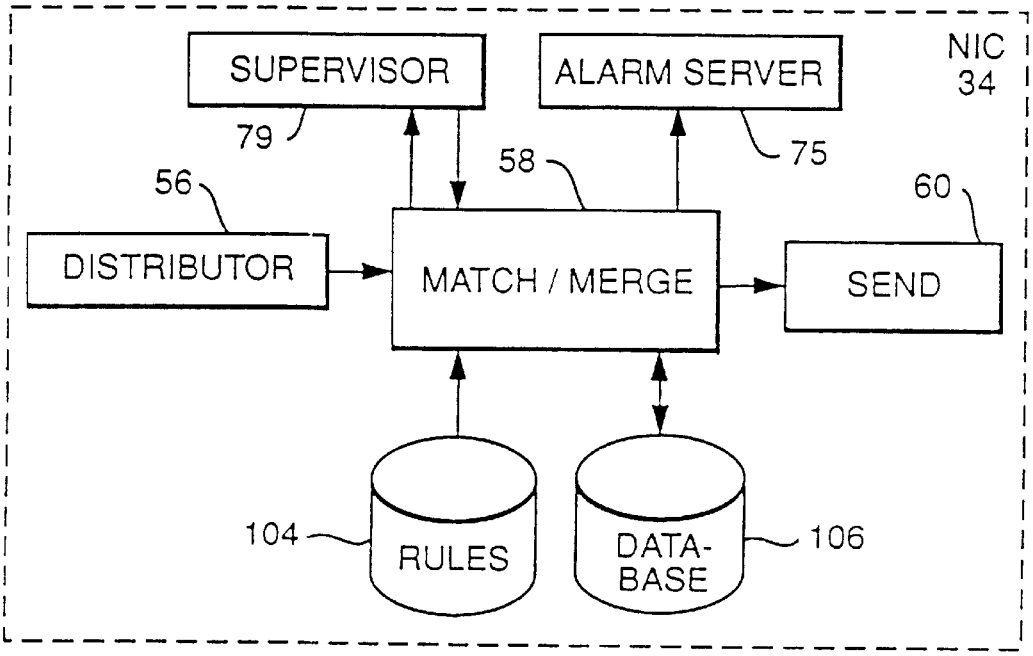
FIG. 10 is a data flow diagram for the match/merge subsystem of the NIC.

FIG. 10 illustrates the data flow diagram for the match/merge subsystem 58. The primary purpose of this subsystem is to match operator service record (OSR) with billing data record (BDR) elements of the same type of call. For example, an operator assisted long distance call has two types of billing records produced from two separate platforms. The match/merge subsystem concatenates (merges) the elements for downstream billing applications. The distributor 56 sends operator service records (OSRs) and billing data records (BDRs) to the match/merge subsystem. The OSRs originate at network switches 10, 11 (FIG. 5) and the BDRs originate at the ISN LAN 52 (FIG. 5). The match/merge subsystem matches elements of these respective records for the same call and merges them for passage downstream to billing applications. The database 106 stores database records on a hard drive. Key fields in OSRs and BDRs records generate a hash key for insertion in the database. Hash keys pointing to the same location is indicative of a match. In actual implementation of the present system, the database may be an object-oriented database, such as marketed by the Versant Corporation of Menlo Park, Calif.

BDR drop rules are read from a rules file on hard disk 104. NIC event records (NER) reporting rules (i.e., interval) to the supervisor 79 are also read from the rules file. The match/merge subsystem sends unmatched data records to the send subsystem 60.

Process Flow for the Match/Merge Subsystem

Figure 17:
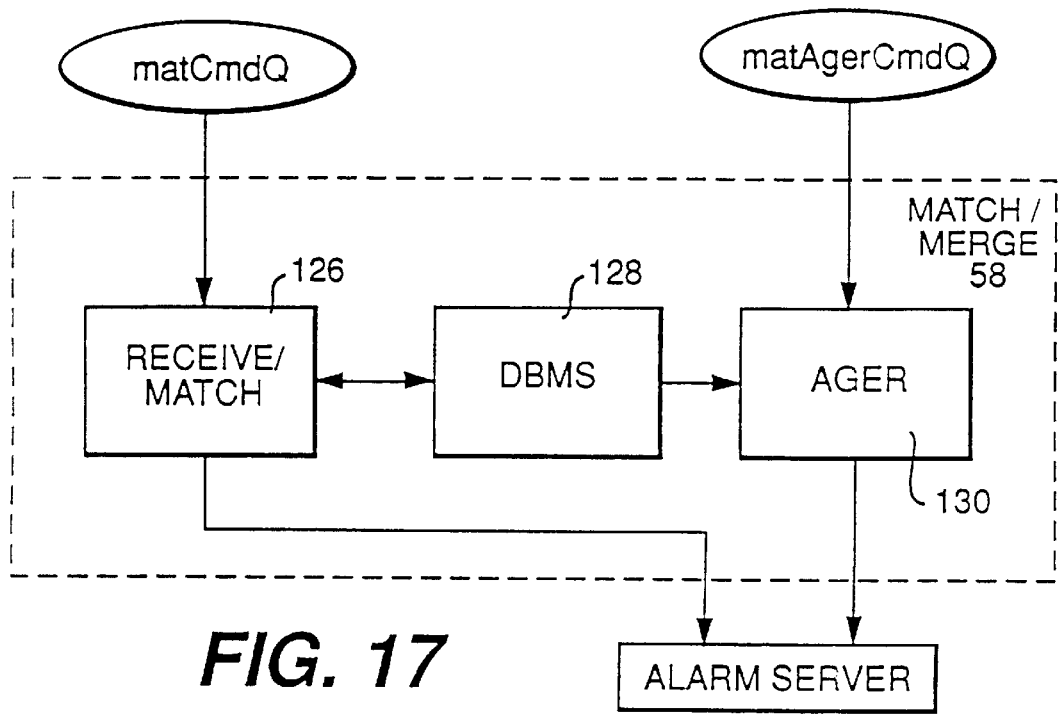
FIG. 17 is a process flow diagram for a match/merge subsystem of the NIC.

As shown in FIG. 17, the match/merge subsystem 58 consists of two main processes: The receive/match process 126 and the ager process 130. The supervisor will start the receive/match and ager processes. The receive/match process will communicate with the supervisor, the distributor, and send subsystems. The ager process will communicate with the supervisor and send subsystems. The supervisor will send shutdown messages to the receive/match and ager processes through queues named matCmdQ and matAgerCmdQ. The two match/merge processes will shutdown on the receipt of a shutdown message. The supervisor will receive two NERs, one from the receive/match process and one from the ager process. Processing errors will generate alarms which are transmitted to the alarm server. Match/merge will send status NERs to downstream hosts every time it is initialized or shutdown. Match/merge will also indicate to downstream hosts when it detects an anomaly that could possibly result in an inaccurate NER. When the matched/aged NERs are created, the data type field of common API will indicate that the data is inconsistent.

Figure 18:
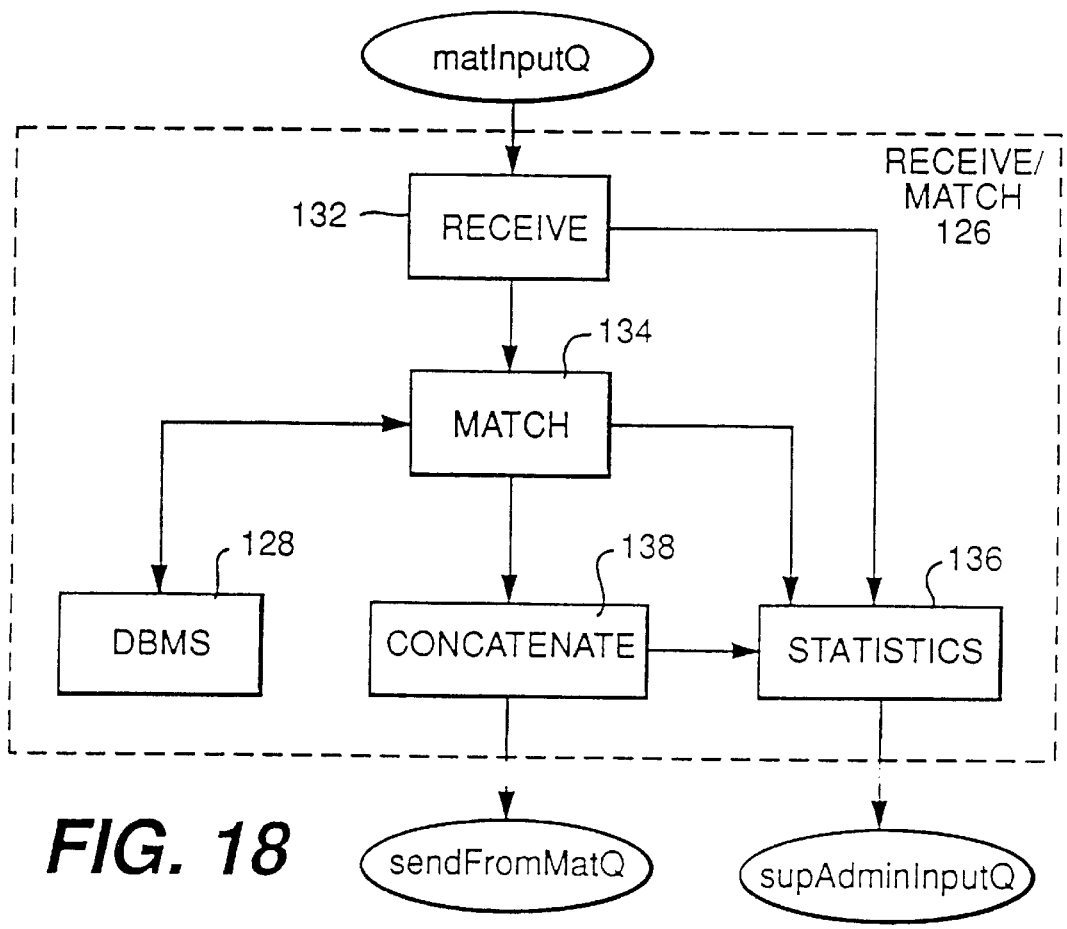
FIG. 18 is a process flow diagram for a receive/match subsystem of the NIC.

The receive/match process 126 of the match/merge subsystem (FIG. 18) includes four major functions: receive 132, match 134, concatenate 138, and statistics 136. The receive function will receive BDRs and CRs from the distributor through matInputQ queue. After validating the records it will pass them on to the match function. The match function will attempt to match the BDR/OSR with its corresponding E/P/EP/OSR/BDR. If a match is found the records are combined in the concatenate function and sent to the send subsystem by the SndFromMatQ queue. If no match is found, the records are stored in the data base. The statistics function uses the Generalized Statistics Library (GSL) (FIG. 5) to keep the following counts: BDRs received, BDRs dropped (with reason code), BDRs matched, E/P/EP/OSRs received, E/P/EP/OSRs dropped (reason), and E/P/EP/OSRs matched. These counts will be sent to the supervisor through the supAdminInputQ queue. The following discussion will elaborate upon the individual function modules.

The receive module 132 will receive the BDRs/OSRs from the distributor and drop the message if the data type field of the API header is not valid and inform the alarm server. In the case of a valid BDR/OSR, each BDR/OSR record will be extracted and a routine will be called to count the received BDR/OSR record. Some fields of the BDR record will be examined to check its match ability. If the record is found to be unmatchable, it will be dropped and a routine will be called to count the dropped BDR with a specific drop code.

The match module 134 will attempt to match BDR/OSR with its corresponding E/P/EP/OSR/BDR stored in the DBMS 128. It will generate a unique key from the four matching fields (Accounting Office, Site number, Operator position and Call Id.) using a hash function. If the duplicate key exists in the same record type, the record will be dropped and the GSL routine will be called to generate a drop count with a reason code indicating a duplicate. Otherwise, the key will be used to find the matching BDR or E/P/EP/OSR from the DBMS 128 (database management system). If any match is found, the record will be retrieved from the DBMS and the GSL routine will be called to increment the appropriate matched E/P/EP/OSR/BDR counters. In the case of a no-match, the record will be stored in the DBMS.

The concatenate module 138 will concatenate the matching E/P/EP/OSR and the BDR to generate a MOSR record. The appropriate position of the BDR record in the MOSR format will be adjusted depending on the size of the E/P/EP/OSR record.

The Statistics module 136 will be executed periodically to generate a consolidated report of all the following counters: BDRs received, BDRs dropped (with reason code), BDRs matched, E/P/EP/OSRs received, E/P/EP/OSRs dropped (reason), and E/P/EP/OSRs matched. The generated report will be appropriately formatted and sent to the supervisor admin. subsystem.

Figure 19:
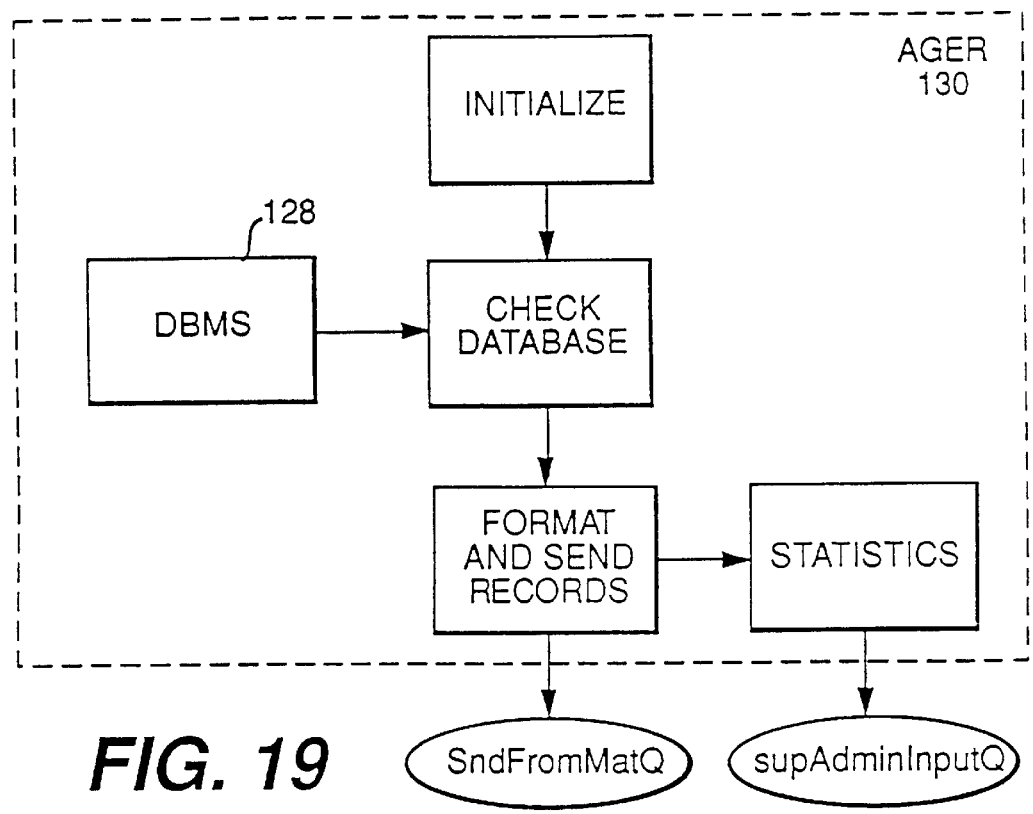
FIG. 19 is a process flow diagram for an ager subsystem of the NIC.

FIG. 19 illustrates the flow within the ager process 130, initially shown in FIG. 17. The remaining boxes shown in FIG. 19 indicate initialization and database checking to examine the database BDR and CR records and determine which records have resided there longer than the aged time limit. The box indicating format and send records functions block aged unmatched BDR and CR records. The statistics module is executed periodically to generate a consolidated report regarding aged unmatched records. The ager process will periodically examine the records in the data base and determine whether they have resided there for a specified amount of time. Aged unmatched BDRs and aged unmatched E/P/EP/OSRs will be flushed from the database to the Send subsystem through SndFromMatQ. The statistics function uses GSL to keep the following counts: aged unmatched BDRs and aged unmatched E/P/EP/OSRs. Reports of these counts will be sent to the supervisor through the supAdminInputQ queue.

The Send Subsystem
Data Flow for the Send Subsystem

Figure 11:
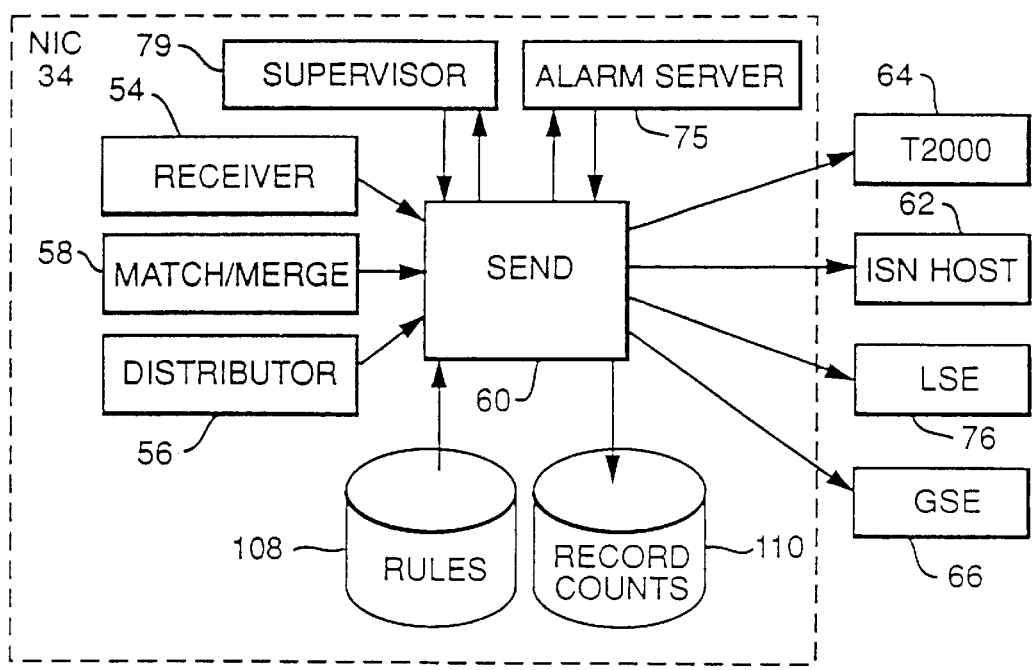
FIG. 11 is a data flow diagram for the send subsystem of the NIC.

FIG. 11 is a data flow diagram of the Send subsystem 60. Basically, the Send subsystem performs the converse function of the Receive subsystem. Namely, to transport the output of the NIC to downstream client subsystems. All retransmission rejects from the APs are passed to the Send subsystem by the receiver subsystem. All matched operator service records (MOSRs), unmatched aged E/P/EP/OSRs, and unmatched aged BDRs will be passed to the Send subsystem by the match/merge subsystem. All call records received from the APs, GSE specific call records, retransmission data and all BDRs received from the ISN LAN will be passed to the Send subsystem. Rules governing the Send subsystem are stored on hard disk 108. These rules may pertain to the record count generation time for NIC event records (NERs), the record count generation time for each client, etc.

Various outputs are shown from the Send subsystem 60 in FIG. 11. These include a hard disk 110. The record sent to each client is counted and maintained by the Send subsystem, on the disk. The generalized statistics engine (GSE) receives specific call records from the APs. The LSE receives alarms from the alarm server. All MOSRs, full feed BDRs, unmatched aged BDRs, unmatched aged E/P/EP/OSRs, and NERs are sent to the ISN host. The T2000 traffic processor receives CRs from the APs and retransmission rejects. NERs of the T2000 are sent to an input of the T2000. Record counts for the T2000, calculated by the Send subsystem, are sent to the supervisor. The Send process sends a connection registration message to the supervisor. This message is used to determine the connections that the Send subsystem is servicing.

Process Flow for the Send Subsystem

Figure 20:
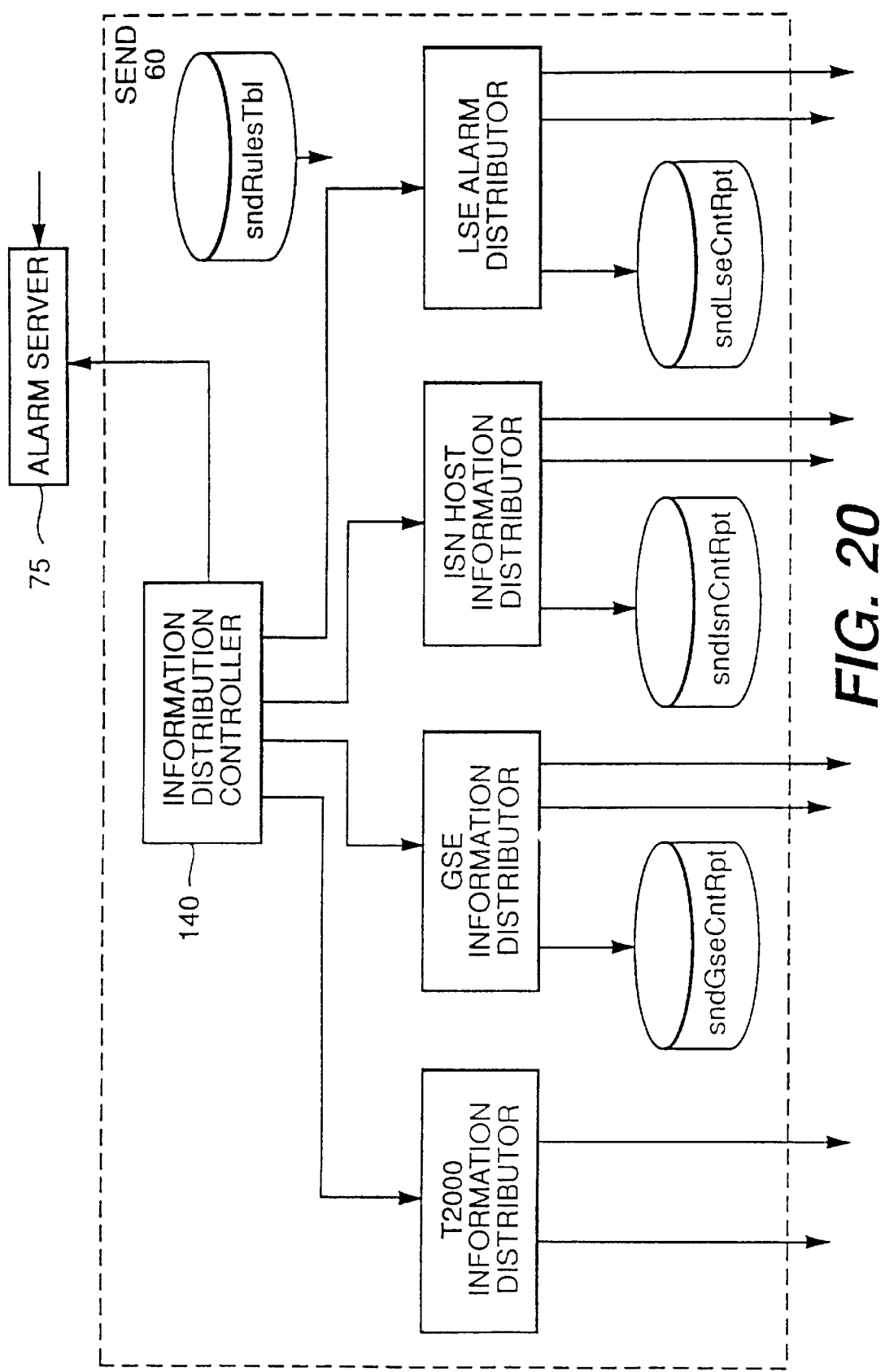
FIG. 20 is a process flow diagram for a send subsystem of the NIC.

In FIG. 20, a process flow diagram for the Send subsystem 60 is illustrated. As indicated, it comprises a number of modules to be discussed as follows.

The Information Distribution Controller process 40 is responsible for starting and maintaining its child processes (Information Distributor). The LSE Alarm Distributor process 76 (FIG. 5) will be started at the Controller process start up. The other Information Distributor processes will be started as the connection request is received by the Controller process. The Controller process will restart any dead Information Distributor processes. The Controller process is also responsible for receiving all the data from its upstream processes. The main process will examine the Common API header to determine the data destination and route the data to an appropriate Information Distributor process that is handling the connection to the data destination. The sections that follow discuss module design of the Information Distribution Controller.

Figure 21:
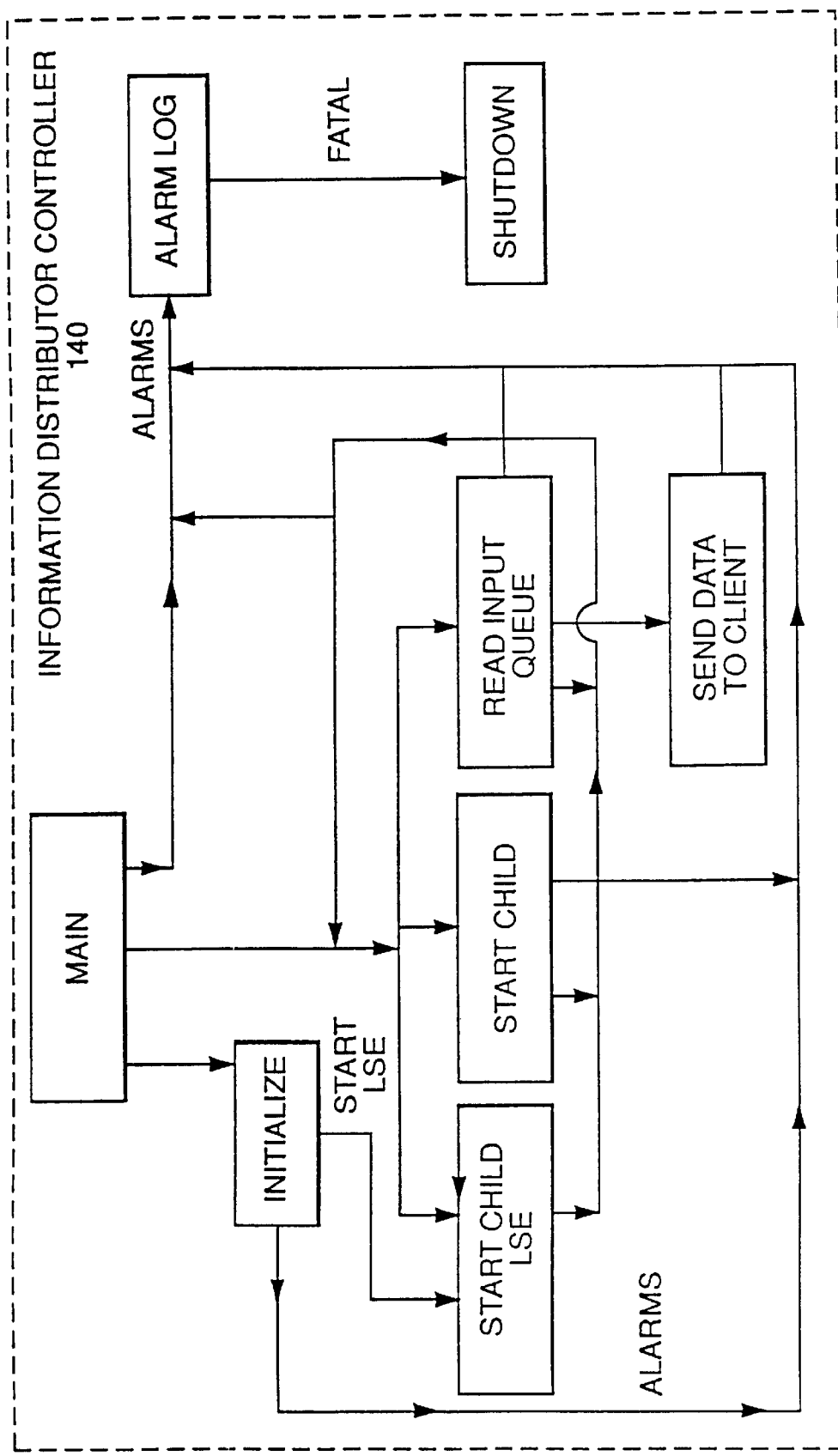
FIG. 21 is a process flow diagram for an information distribution subsystem of the NIC.

In FIG. 21, the main module will call necessary modules to handle the initialization, signals, and its input queues. After initializing, the main module will forever receive data. There are three different data types: data from its input queues, a signal to indicate a dead child (LSE) and a connection request from a client. The queue input will be handled by calling the Read Input Queue module. The signal is handled by calling the Start Child LSE module to restart the dead child. The connection request is handled by calling the Start Child module to start a child to handle the connection. Any alarm condition will invoke the Log Alarm module with either fatal or non-fatal condition set.

The Initialize module will be called by the main module to read all the files, open all the queues, initialize global variables and to create and initialize shared virtual memory. The shared virtual memory will be used to maintain information on the child processes.

The Start Child LSE module is called by the main and the initialize modules to start a child to handle the connection to the LSE. The initialize module calls this function at the process startup and the main module calls this module to restart a process. The start child module is called by the main module to handle a connection request from a client.

The read input queue module is called by the main module whenever there is a message on any of its input queues. There are two types of messages: the shutdown message and the client data message. Whenever a shutdown message is received, this module will log the condition and terminate by calling the Log Alarm module. The client data message will be handled by looking at the API to determine the data destination and sending the data to the appropriate Information Distributor process handling the destination connection. This module will also detect any data with multiple destinations and clone as necessary.

The log alarm module is called by all other modules whenever an error condition is detected. This module will log the alarm to the Alarm Server and determine if the error condition is fatal. The Shutdown module will be called for all fatal conditions. The Shutdown module is called by the Log Alarm module whenever a fatal condition is encountered. This module is responsible for cleaning up and terminating the process. A termination includes notifying all its child processes of the shutdown condition and terminating any child process underway after some rule table determined time. This module will terminate the Information Distribution Controller process after all its child processes (Information Distributor) terminate.

Figure 22:
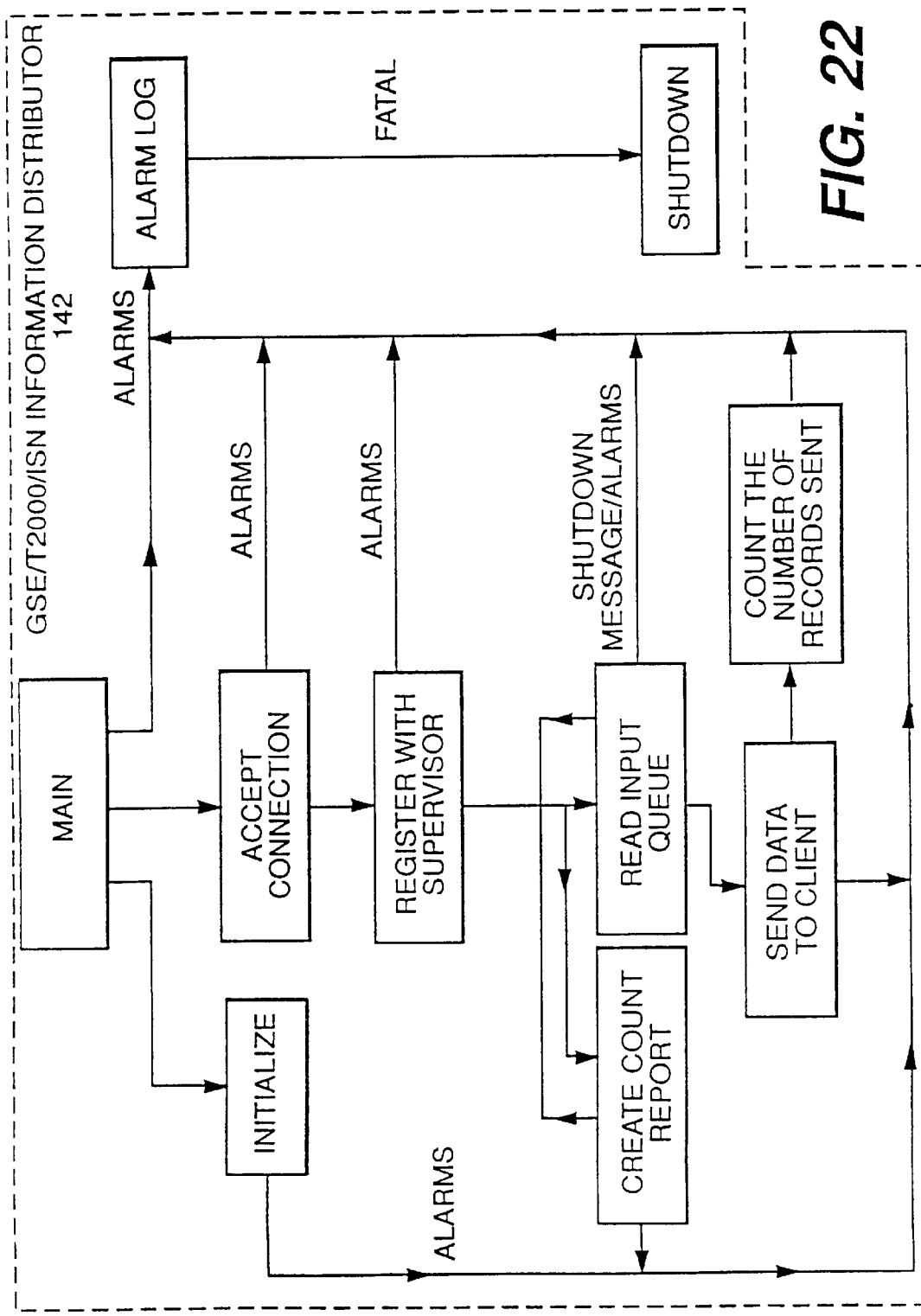
FIG. 22 is a process flow diagram for a more detailed information distribution controlling subsystem.

FIG. 22 illustrates the Information Distributor processes are started and terminated by the Information Distribution Controller process. The Information Distributor process handling the T2000 connection will transmit all data received from the APs, T2000 NERs, and the retransmission rejects to the T2000. The Information Distributor process handling the GSE connection will transmit a subset of Call Records received from the APs to the GSE. Both connections to T2000 and to the GSE will be established and maintained by the client. The Information Distributor process handling the ISN connection will transmit the MOSRs, full feed BDRs, unmatched aged E/P/EP/OSRs, unmatched aged BDRs, and the ISN NERs to the ISN Host. The connections between the NIC and the clients (T2000, GSE and ISN Host) will be initiated and maintained by the clients. The following discussion highlights the modules of FIG. 22.

The main module will call necessary modules to handle the initialization, signals, and its input queues. The main module will call the Accept Connection module to accept the connection from the clients (T2000, GSE or ISN) and to send a registration response to a valid registration request message. Once the connection is established, the main module will call the Register with Supervisor module to notify the Supervisor subsystem of the connection success status. After the registration with the Supervisor, the main module will loop forever to handle both the incoming data from the Information Distribution Controller process and the count timer. The Read Input Queue module will be called to handle the incoming data and the Create Count Report module will be called to handle the count timer.

The initialize module will be called by the main module to read all the files, open all the queues, initialize global variables and to create and initialize shared virtual memory. The shared virtual memory is used to keep the number of records sent to the client.

The accept connection module will be called by the main module to accept a connection request from a client (T2000, GSE or ISN). Once the connection registration request message is verified, this module will send a registration response to the client to complete the connection. An invalid registration request will invoke "Log Alarm" with a fatal condition set.

The register with Supervisor module is called by the main module after the connection to the client is established. This module will send a registration message to the Supervisor to announce the successful connection condition. The information will also contain the client the process is currently serving.

The create count report module is called by the main module whenever a count timer expires. This timer indicates a count reporting event. The total number of records sent to the clients are calculated and either sent to the Supervisor or are created into a count report. The counts recorded for the T2000 may be sent to the Supervisor in a T2000 NER format.

The read input queue module is called by the main module whenever there is a message in the input queue. There are two types of inputs: a message to terminate and client data messages. The termination messages are handled by calling the Log Alarm module with a fatal error condition set. The client data messages are sent to the clients by calling the send data to client module.

The send data to client module is called by the Read Input Queue module to handle the client data messages. This module will send the data to the client it is currently serving. If send is successful, the number of records sent will be counted by calling "Count the number of Records sent" module. The count number of records sent module will count the number of records sent to the clients. The Call Records from the APs will be counted on the basis of their switch. The record counts will be stored in the shared virtual memory.

The log alarm module is called by all other modules whenever an error condition is detected. This module will log the alarm to the Alarm Server and determine if the error condition is fatal. The shutdown module will be called for all fatal conditions. The shutdown module is called by the Log Alarm module. This module is responsible for cleaning up and terminating. This module will deregister with the Supervisor before terminating the process.

Figure 23:
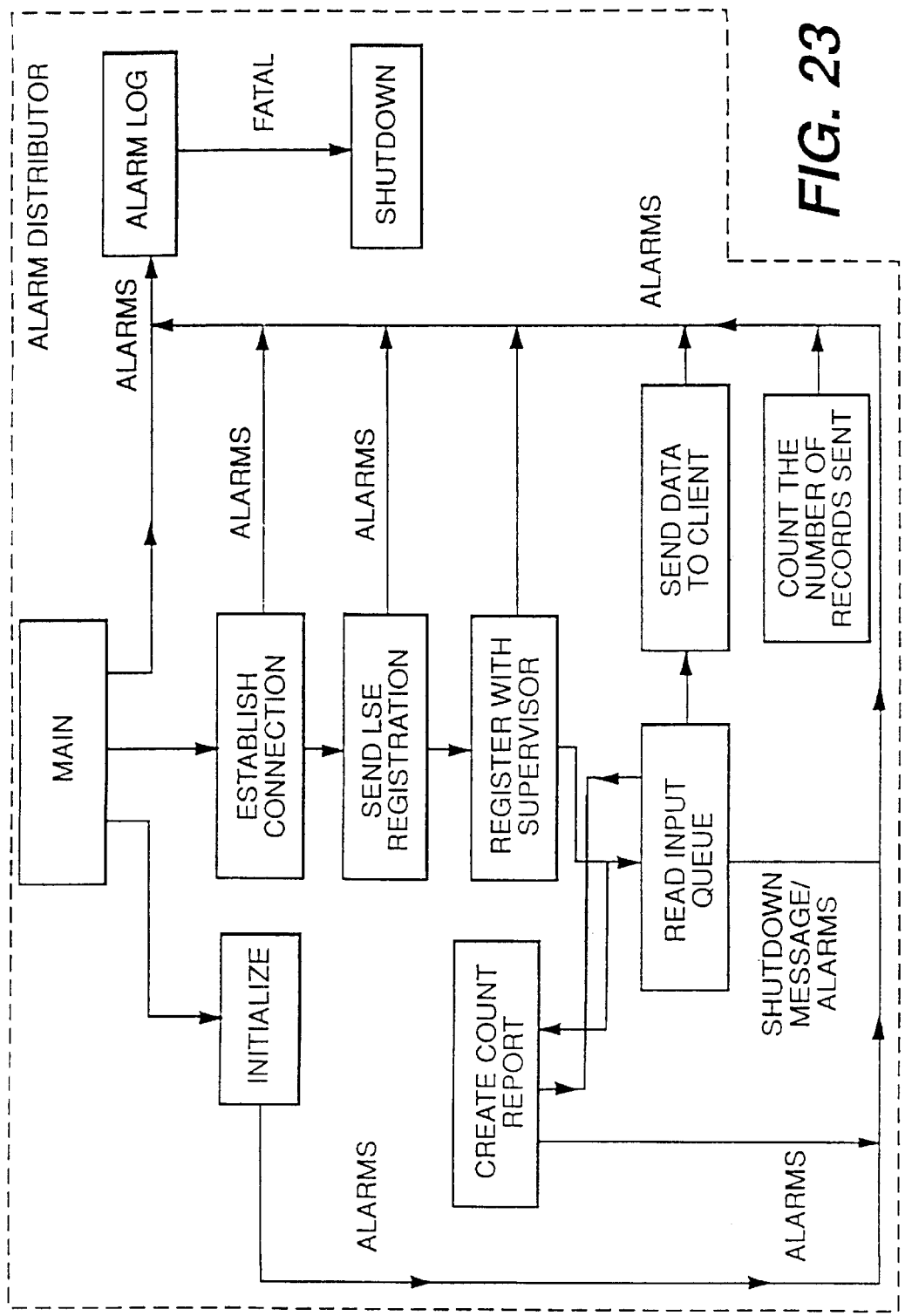
FIG. 23 is a process flow diagram for an alarm distributor subsystem of the NIC.

FIG. 23 shows the alarm distribution process for the LSE. The Send subsystem will transmit a subset of NIC generated alarms to the LSE. The "I'm alive" message, generated by the Supervisor subsystem, will also be included in the alarms sent to the LSE. The connection to the LSE will be established and maintained by the NIC. FIG. 23 illustrates the module flow within the Alarm Distributor for LSE. The sections that follow discuss module design.

The main module of the alarm distributor will call necessary modules to handle initialization, connection to its clients, signals, and its input queues. The main module will call necessary modules to initiate and complete the connection by sending a LSE registration message. Once the connection to the LSE is completed, the main module will loop forever to handle its input data and the count timer. The initialize module will be called by the main module to read all the files, open all the queues, initialize global variables and to initialize shared virtual memory. The shared virtual memory will be used to store the record count information.

The establish connection module is called by the main module to initiate the connection to the LSE. The send LSE registration module is called by the main module after the connection to the LSE is accepted. This module will sent an LSE registration to the client. Successful sending of the registration completes the connection to the LSE. The create count report module is called by the main module whenever a count timer expires. This timer indicates a count reporting event. The total number of records sent to the LSE are calculated and created into a report.

The read input queue module is called by the main module whenever there is a message in the input queue. There are two types of inputs: signals to terminate and client data messages. The termination signals are handled by calling the Log Alarm module with a fatal error condition set. The client data messages are sent to the client (LSE) by calling Send data to Client module.

The send data to client module is called by the Read Input Queue module to handle the client data messages. This module will send the data to its client and if successful, count the number of records sent by calling Count the number of Records sent module. The count the number of records sent module will count the number of records sent to the clients. The counts will be stored in the shared virtual memory.

The log alarm module is called by all modules whenever an error condition is detected. This module will log the alarm to the Alarm Server and determine if the error condition is fatal. The Shutdown module will be called for all fatal conditions. The shutdown module is called by the Log Alarm module. This module is responsible for cleaning up and terminating. A termination includes notifying the Supervisor of the connection termination by sending a deregistration message.

Supervisor Subsystem
Data Flow for the Supervisor Subsystem

Figure 12:
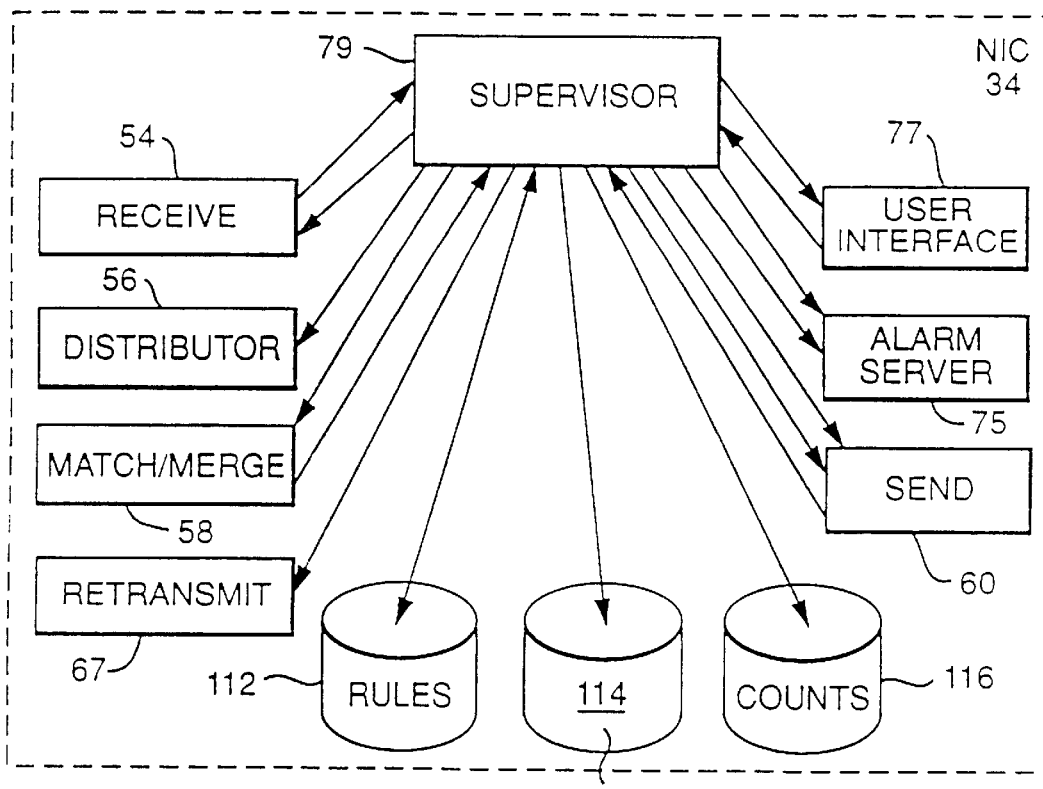
FIG. 12 is a data flow diagram for the supervisor subsystem of the NIC.

FIG. 12 is a data flow diagram for the supervisor subsystem 79. The supervisor subsystem is responsible for NIC process monitoring, process management, interprocessor communication, and administrative functions. The supervisor main function is responsible for interprocessor communication services and process monitoring and management services. The supervisor administrative function processes subsystem count information, registration/deregistration message, and switch to AP queries. This subsystem communicates with the other subsystems of the NIC. An output from the receive subsystem 54 provides connection registration information which will be stored in the supervisor subsystem. This information typically includes the identification of any network element which is attached to the receive subsystem. For example, the information includes the identification of adjunct processors that have communicated with the receive subsystem, this retained data being necessary in the event of a retransmit operation, to be discussed hereinafter. Subsystem rules information is stored on hard disk 112, and is read from this storage during supervisor subsystem initialization. Supervisor subsystem rules include: restart rules following abnormal subsystem termination, path names for files, NER generation rules, LSE keep-alive alarm message timer value, and minimum data received from a network element during a given interval threshold.

NIC subsystems can provide count information to the supervisor subsystem at predetermined intervals by writing count information messages. Based on predetermined rules, count information may be used to generate NERs for transmission to downstream clients. Connection registration information is stored following receipt from the Send subsystem. Connection registration information will be updated following receipt of deregistration messages from the Send subsystem. An additional input to the supervisor subsystem 79 includes commands issued at the user interface subsystem 77 that require supervisor subsystem action.

A number of outputs exist from the supervisor subsystem 79. These include shutdown messages to each subsystem to initiate an orderly shutdown of that subsystem. The rules for all subsystems can be added to a hard disk 112. These rules can be added, modified, or deleted using an editor and operating system commands following security validation. Registration information from the supervisor subsystem 79 may be stored on hard disk 114 following receipt of registration/deregistration information from the Receive and Send subsystems. A hard disk 116 stores subsystem count information to provide a minimum of 24 hour retention.

Formatted NER for transmission to the T2000 traffic processor or the ISN host are generated from subsystem count information. When NER count information is received from a subsystem, it will be formatted, prepended with the NIC API header, which will indicate the destination client. Alarms generated by the supervisor subsystem in the various operations discussed above are transmitted to the alarm server.

Process Flow Diagram for Supervisor Subsystem

Figure 24:
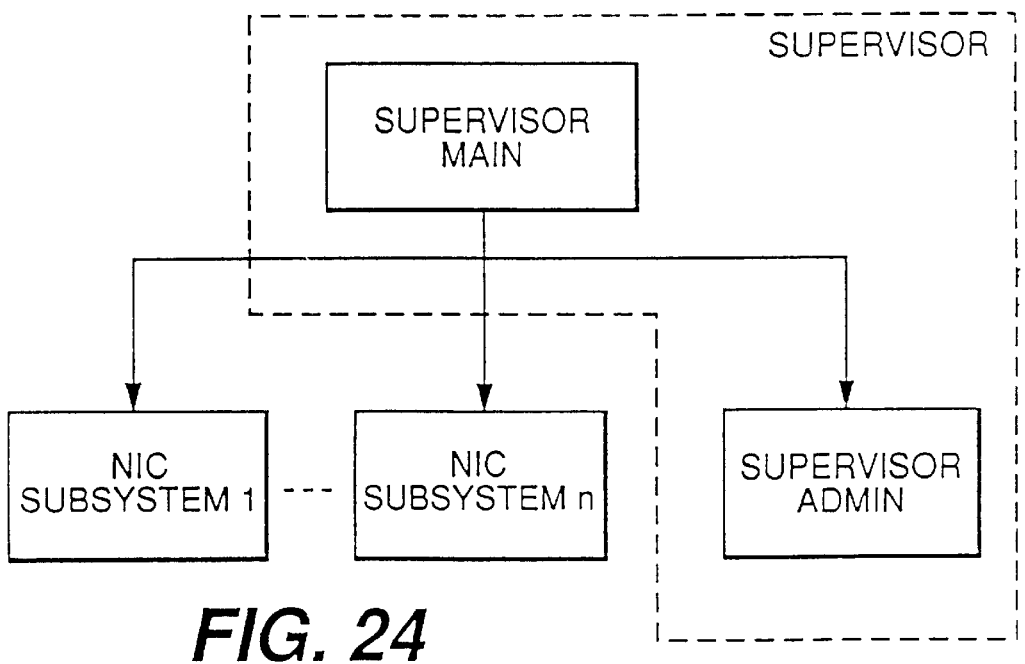
FIG. 24 is a process flow diagram for a supervisor subsystem of the NIC.

FIG. 24 is a process flow diagram for the supervisor subsystem. This subsystem is responsible for NIC process monitoring, process management, IPC, and administrative functions. The supervisor subsystem is broken down into a supervisor main function and a supervisor administrative function. The supervisor main function is responsible for IPC services and process monitoring and management services. The supervisor main module starts and shuts down all NIC processes, including the supervisor administrative function. The latter mentioned function processes subsystem count information, registration/deregistration messages, and switch to AP queries.

User Interface Subsystem
Process Flow for the User Interface

Figure 13:
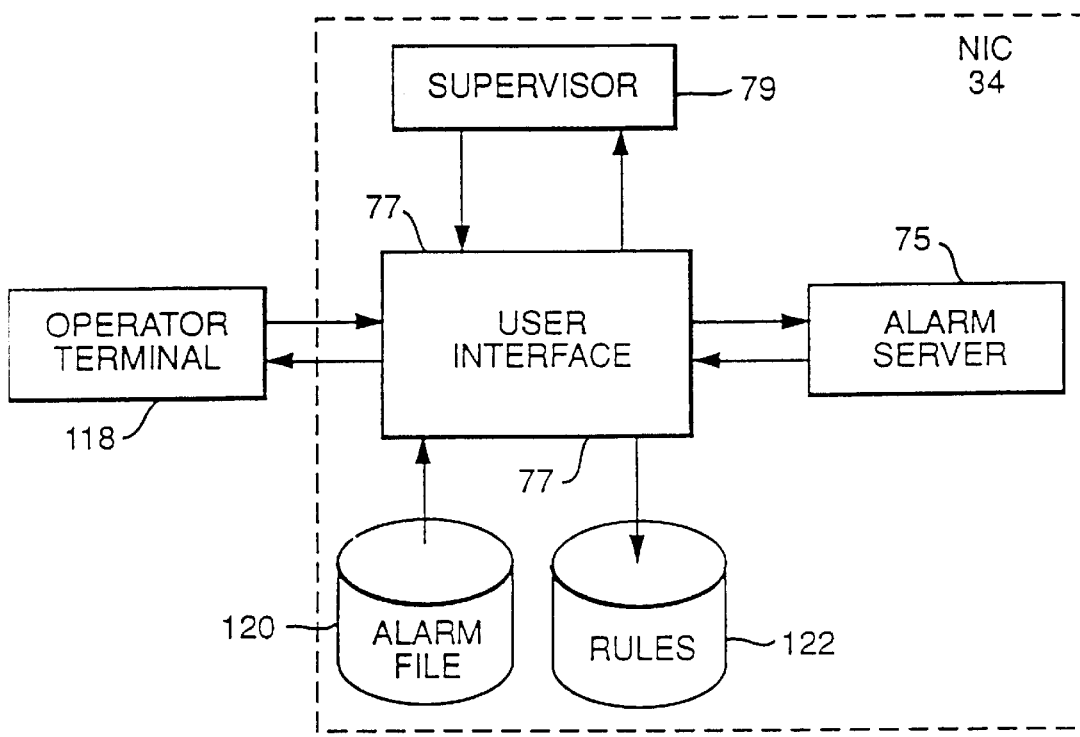
FIG. 13 is a data flow diagram for the user interface subsystem of the NIC.

FIG. 13 illustrates a data flow diagram for the user interface subsystem 77. The User Interface is a collection of processes that facilitates the user access to the NIC subsystems. In addition to facilitating user access to the various NIC subsystems, the User Interface subsystem implements the NIC security controlling user access to NIC resources. The inputs to the subsystem will now be discussed.

The supervisor subsystem transmits a shutdown message to the user interface to initiate a shutdown of the user interface subsystem. With respect to the operator terminal 118, an operator may use the terminal running the user interface to enter input required for each request submitted to the NIC subsystem. The user interface provides the alarm file 120 viewing utility which allows the user to view alarms stored in the alarm file. The alarm file viewer may read and display them to the screen, in a graphical manner. Stored on hard disk 122 are the rules files, such as subsystem run time rules, routine thresholds and configuration files, that may be read and displayed to the user by the user interface. Alarm messages with special severity and class may be routed by the alarm server subsystem to the user interface. The interface subsystem includes a number of outputs which will now be described.

Error messages occurring during each processing of the user interface are posted to the operator terminal 118. Alarm messages with a special class and severity routed by the alarm server are displayed to the operator terminal. The user interface manages operator access to the NIC rules files (122) and handle file editing and management. Alarm messages detected within the user interface are posted to the alarm server subsystem. These alarm messages include such high level messages as security breaches and system-wide critical conditions. Operator requests accepted by the user interface are submitted to the supervisor subsystem for proper processing. The NIC API is used to send these requests to the supervisor subsystem.

Process Flow Diagram For User Interface Subsystem

Figure 25:
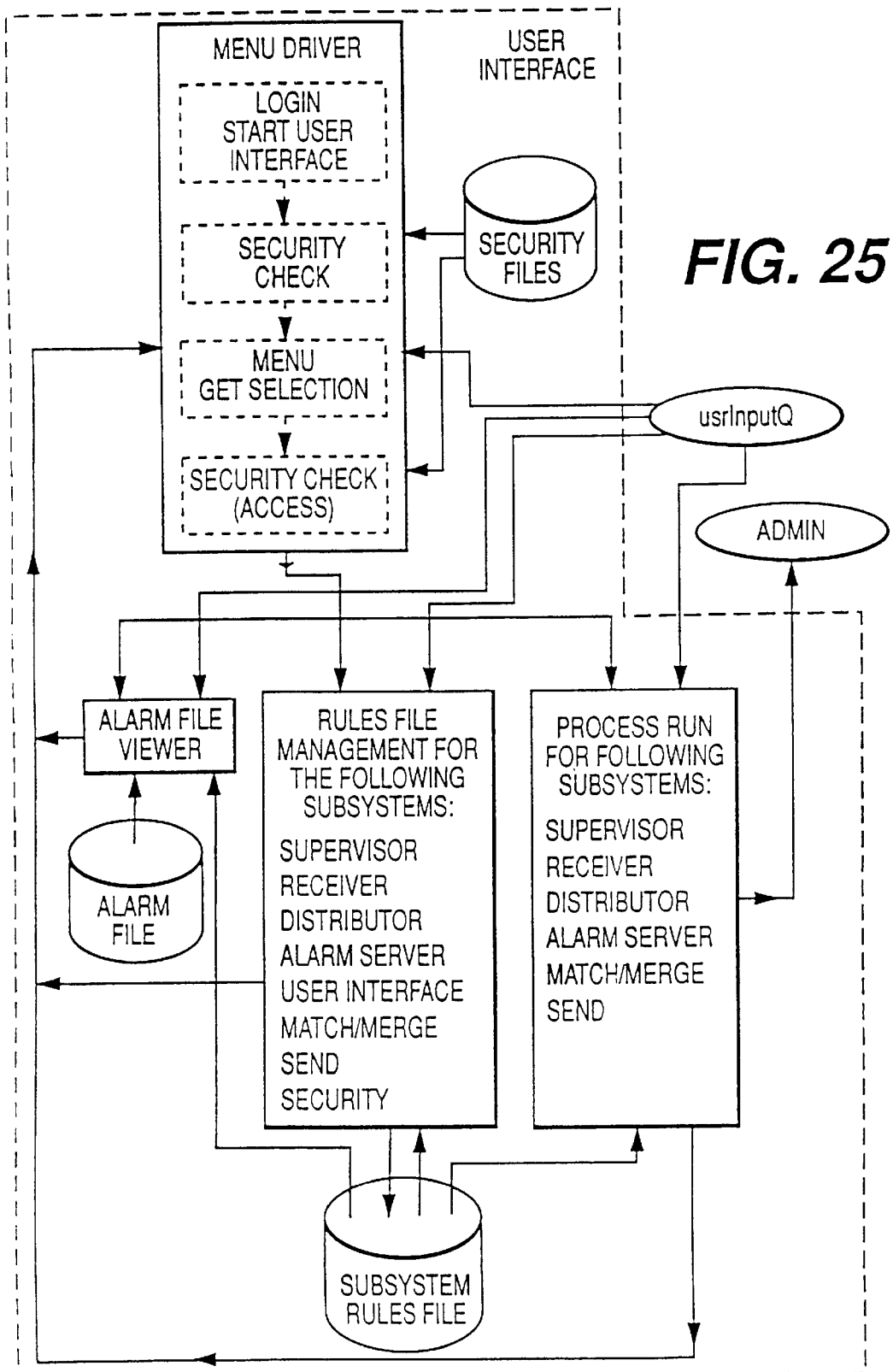
FIG. 25 is a process flow diagram for a user interface subsystem of the NIC.

FIG. 25 is a function flowchart of the user interface subsystem. The various modules will now be discussed. The menu driver is the process that the user logs into at the time of User Interface start. The Menu Driver validates the user security and access permissions. The menu driver also displays the available process menus to the user. Upon user login the User Interface is started. The first operation of the User Interface is to establish the user name and start subsequent processes. The security checking process involves the checking of the user name in the user name security table to determine the user access privileges.

The menu get selection is a representation of the User Interface main menus. This menu represent the menu option for running the Alarm Viewer, the Rules Files editing and the Process Running menus. The menu will display only those options allowed by the user security access permissions. Each of these three menus have a different access level for the user. In the security check module, the user access level is checked against the application security table for the selected subsystem. This security check determines the type of access the user has to each subsystem.

The Alarm File Viewer is the module that allows the user to view alarms contained within the alarm file. The Alarm File Viewer will open the alarm file and read a number of alarms for display to the screen. The user can either scroll through the alarms one by one or page by page.

There are two types of operations with the Rules files. The first is a simple table edit where the User Interface reads a rule file and display its content to the screen. If the user is security authorized to edit the file then the user will be able to change the values. If not then the user can only view the file. Each subsystem listed in the rules files management box has its own detail menu for its files. The second operation shall involve the editing of a record from a file containing multi-records. In this case, the user will be presented with a list of the records, by selecting one of the records the user can view. If authorized, he may edit the fields within these records.

Process Management has the facility to edit process run time configuration files for defining subsystem processes run environment. Process Management modules have the capability of monitoring processes and of automatically restarting them if required.

Retransmit Subsystem
Data Flow for the Retransmit Subsystem

Figure 14:
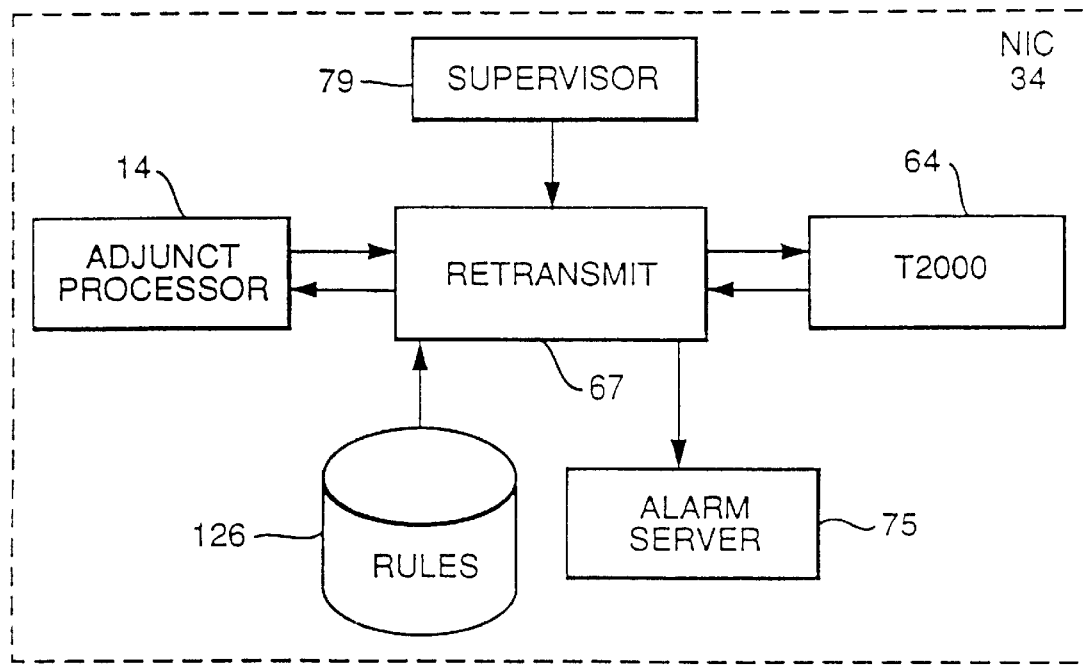
FIG. 14 is a data flow diagram for the retransmit subsystem of the NIC.

FIG. 14 illustrates a data flow diagram for the retransmitted subsystem. The Retransmit subsystem is responsible for requesting retransmission of Adjunct Processor data per T2000's request. The Retransmit subsystem will have a dual personality—it will be both a client and a server. It will act as a server when communicating with T2000 and as a client when communicating with an Adjunct Processor. When acting as a server, T2000 will be responsible for initiating the connection—the Retransmit Subsystem will be in a continuous loop waiting for its request. When acting as a client, the Retransmit Subsystem will be responsible for initiating the connection—an Adjunct Processor will be in a continuous loop waiting for its request. The Retransmit subsystem process will be started and stopped by the Supervisor subsystem. If the Supervisor subsystem requests a shutdown/connection termination, the ports will be shutdown.

The following discussion will explain the basic inputs to the retransmit subsystem, as shown in FIG. 14. The traffic processor (T2000) is the initiator of a retransmit request. The adjunct processor will send a response back to the retransmit subsystem in the event of an invalid connection request and all forwarded T2000 retransmission requests. The supervisor subsystem sends shutdown requests to the retransmit subsystem. A hard disk 126 stores retransmit rules for operation, initial configuration data, thresholding information and subsystem control information. The rules, as in the case of the rules of other subsystems, are tables loaded into memory from a corresponding rules file at subsystem startup.

The outputs for the retransmit subsystem include one which sends a reply message back to the T2000 if an invalid connection request or invalid retransmission request occurs. In the event of a T2000 retransmission request, the retransmit subsystem establishes a connection with the appropriate adjunct processor and then forwards that retransmission request. The retransmit subsystem generates its own alarms and sends them to the alarm server. Alarms occur for the following conditions: bad connection request, invalid retransmission request, shutdown request, OS level failure, and unexpected disconnect, etc.

In a refinement of the present invention, the GSE 66 (FIG. 5) is able to process retransmission requests as does the traffic processor (T2000) in the NIC. Thus, the GSE will be able to request one or more switch blocks or an entire call history file from an adjunct processor (AP). The GSE will validate the request and determine which AP made the request, so that retransmission may occur. The GSE is the subject matter of co-pending patent application Ser. No. 08/438,918.

Process Flow for the Retransmit Subsystem

Figure 26:
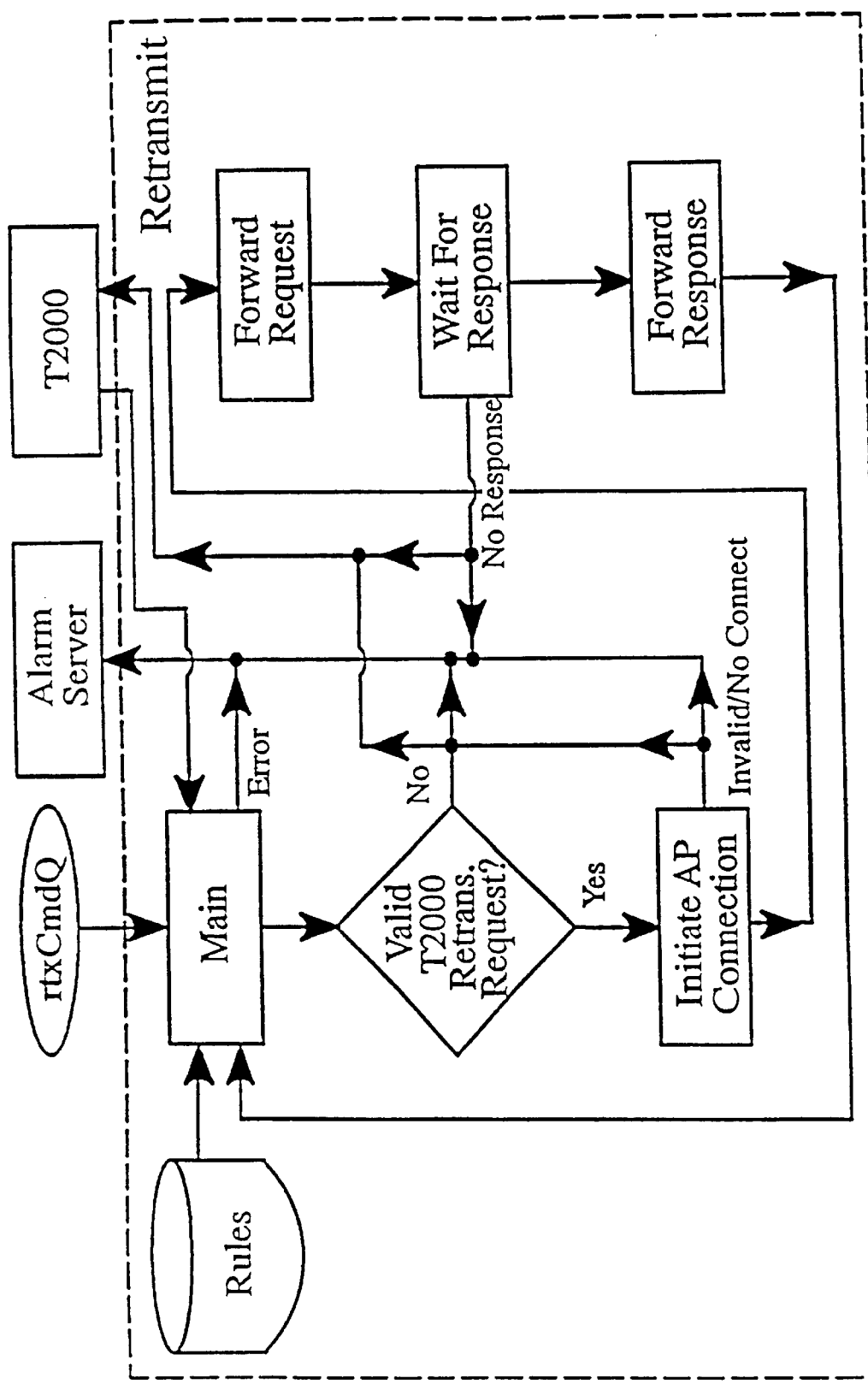
FIG. 26 is a process flow diagram for a retransmit subsystem of the NIC.

The main module indicated in FIG. 26 is responsible for performing the administrative and initialization functions of the retransmit subsystem by reading the rules file, initializing itself as a server, checking for the T2000 retransmission requests, and checking for commands from the supervisor queue.

When retransmission of adjunct processor data is needed, the T2000 (being the client) issues a retransmission request to the retransmit subsystem. If invalid, an alarm message is generated and sent to the alarm server and also back to the T2000. Otherwise, the retransmit subsystem tries to establish a connection to the appropriate adjunct processor. FIG. 26 indicates the appropriate decisional step following the main module.

If the T2000 retransmission request was successful, the retransmit subsystem (now being the client) next needs to initiate a connection to the appropriate adjunct processor. This is indicated by the initiate AP connection module. If a connection cannot be established, an alarm message is generated and sent to the alarm server and also back to the T2000. Otherwise, the retransmission request is forwarded to the AP.

The retransmission subsystem acts as a "mediator" between the T2000 and the APs. It forwards requests, as a result of the forward request module, from the T2000 to the AP and it forwards responses back from the AP to the T2000. If a successful connection was established, the retransmit subsystem forwards the original retransmission request from the T2000 to the appropriate AP.

After a retransmission request is forwarded to an AP, the retransmit subsystem will wait and listen for a predetermined time in order to receive a response back from the AP. If no response is received in the predefined time from the AP, an alarm will be generated and sent to the alarm server and also back to the T2000. Otherwise, the received response will be sent back to the T2000. If a response was received by the retransmit subsystem, the forward response module forwards the message back to the T2000.

It should be understood that the invention is not limited to the exact details of construction shown and described herein for obvious modifications will occur to persons skilled in the art.

We claim:

1. In a telephone network having switches, other network elements, and data access points, all located at inputs of respective adjunct processors for collecting and storing call detail records presented at the inputs, the call detail records being utilized by a plurality of downstream application subsystems, the data from the records being useful to end users, a consolidated feed comprising:

network information concentration means for providing single point access between outputs of each adjunct processor and downstream application subsystems, the network information concentration means selecting data fields from call detail records supplied by the adjunct processors, as required by the subsystems; and means for connecting the applications subsystems to end users requiring data from corresponding selected fields and processed by selected subsystems;

wherein the network information concentration means further includes means for receiving call records from the adjunct processors;

distributor means for detecting the type of call record being received;

means for detecting anomalies in the call records being received;

means for generating a request for retransmission of call records, to a respective adjunct processor, when a missing record is detected;

means for processing the call records in accordance with a selected application; and means for sending processed call records to a downstream user of the processed call records.

2. The system set forth in claim 1 wherein the processing means, are connected in parallel between the distributor means and the sending means, and further comprising:

a user interface for allowing a downstream user to access raw unprocessed data;

an alarm server for detecting faults occurring in the architecture; and means for matching billing records, related to a particular telephone call, and generated by different network elements.

3. The system set forth in claim 2 further comprising a traffic processor, connected at an outlet of the network information concentration means, for collecting all call detail record data, the traffic processor generating a request, to the network information concentration means, for retransmission of record data, in the event data is missing.

4. The system set forth in claim 2 further comprising a generalized statistics engine, connected at an outlet of the network information concentration means, for receiving call detail records and performing preselected statistical counts thereon.

5. In a telephone network having switches, other network elements, and data access points, all located at inputs of respective adjunct processors for collecting and storing call detail records presented at the inputs, the call detail records being utilized by a plurality of downstream application subsystems, the data from the records being useful to end users, a consolidated feed comprising:

network information concentration means for providing single point access between outputs of each adjunct processor and downstream application subsystems, the network information concentration means selecting data fields from call detail records supplied by the adjunct processors, as required by the subsystems; and means for connecting the applications subsystems to end users requiring data from corresponding selected fields and processed by selected subsystems;

the network further having a fiberoptic interface connected between the output of each data access point and a related active input of an adjunct processor;

each adjunct processor having a standby input connected to an output of another fiberoptic interface to increase the redundancy of the connection between the fiberoptic interfaces and the data access points.

6. In a telephone network having switches, other network elements, and data access points, all located at inputs of respective adjunct processors for collecting and storing call detail records presented at the inputs, the call detail records being utilized by a plurality of downstream application subsystems, the data from the records being useful to end users, a consolidated feed comprising:

network information concentration means for providing single point access between outputs of each adjunct processor and downstream application subsystems, the network information concentration means selecting data fields from call detail records supplied by the adjunct processors, as required by the subsystems; and means for connecting the applications subsystems to end users requiring data from corresponding selected fields and processed by selected subsystems;

wherein network elements generate application data format requests to the data access points, requesting routing information for telephone calls, the data access points responding with application data format records, the adjunct processors further having means for processing application data format requests received from a data access point;

means for storing records responsive to the requests;

communication management means for providing bi-directional data communication between the network information concentration means and the adjunct processors;

a first output of the management means connected to an input of the storing means for requesting retransmission of application data format records; and means connected between an output of the storing means and an input of the processor for connecting the retransmitted records to the management means for transmission to the network information concentration means, through the management means.

7. In a telephone network having switches, other network elements, and data access points, all located at inputs of respective adjunct processors for collecting and storing call detail records presented at the inputs, the call detail records being utilized by a plurality of downstream application subsystems, the data from the records being useful to end users, a consolidated feed comprising:

network information concentration means for providing single point access between outputs of each adjunct processor and downstream application subsystems, the network information concentration means selecting data fields from call detail records supplied by the adjunct processors, as required by the subsystems; and means for connecting the applications subsystems to end users requiring data from corresponding selected fields and processed by selected subsystems;

wherein the network elements generate bundled blocks of call detail records and corresponding sequence numbers, presented at the inputs, the adjunct processors receiving the sequence numbers and the blocks for subsequent deblocking;

the sequence numbers of the deblocked data being analyzed by the adjunct processors to verify that data is neither duplicated nor missing;

wherein the data is reblocked with new sequence numbers and transmitted to the network information concentration means.

8. In a telephone network having switches, other network elements, and data access points, all located at inputs of respective adjunct processors for collecting and storing call detail records presented at the inputs, the call detail records being utilized by a plurality of downstream application subsystems, the data from the records being useful to end users, a consolidated feed comprising:

network information concentration means for providing single point access between outputs of each adjunct processor and downstream application subsystems, the network information concentration means selecting data fields from call detail records supplied by the adjunct processors, as required by the subsystems; and means for connecting the applications subsystems to end users requiring data from corresponding selected fields and processed by selected subsystems;

wherein the network information concentration means further includes means for receiving call detail records from the adjunct processors and an ISN;

distributor means for detecting the type of call record being received;

means for detecting anomalies in the call records being received;

means for generating a request for retransmission of call detail records, to a respective adjunct processor, when a missing record is detected;

means for processing the call records in accordance with a selected application; and means for sending processed call records to a downstream user of the processed call records.

9. The system set forth in claim 8 wherein the processing means, are connected in parallel between the distributor means and the sending means, and further comprising:

a user interface for allowing a downstream user to access raw unprocessed data;

an alarm server for detecting faults occurring in the architecture; and means for matching billing records, related to a particular telephone call, and generated by different network elements.

10. The system set forth in claim 9 further comprising a traffic processor, connected to an outlet of the network information concentration means, for collecting all call detail record data, the traffic processor generating a request, to the network information concentration means, for retransmission of call detail record data, in the event data is missing.

11. The system set forth in claim 9 further comprising a generalized statistics engine, connected at an outlet of the network information concentration means, for receiving call detail records and performing preselected statistical counts thereon.

12. In a telephone network, network information architecture interposed between network elements at inputs of the architecture, and end users at outputs of the architecture, the architecture comprising:

adjunct processor means for partitioning call detail record data received from network elements of the telephone network;

means having an input connected to a plurality of adjunct processors and an ISN for concentrating at a single point, the information derived from the adjunct processors, the information concentrating means including (a) means for capturing the partitioned data from the plurality of adjunct processors;

(b) means for correlating the captured partitioned data in real time to ensure that captured data is neither lost or duplicated;

means connected at an output of the concentrating means for interfacing selectable correlated data from the concentrating means to users requesting corresponding specific types of data.

13. The apparatus set forth in claim 12 further comprising:

means located at an output of the interface for translating the selectable correlated data to a preselected format.

14. A method for concentrating call records generated by a plurality of network elements to a single information concentration point in a telephone network, comprising the steps:

partitioning data from call detail records, presented by network elements of the telephone network at various points in the telephone network;

feeding the partitioned data to the single concentration point, where the data becomes captured;

correlating the captured partitioned data in real time to ensure that the captured data is neither lost or duplicated; and interfacing selectable correlated data to users requesting corresponding specific types of data.

15. The method set forth in claim 14 further comprising the step of translating the selectable correlated data to a preselected format.

16. The method set forth in claim 14 wherein application data format requests are sent by the network elements to the data access points, requesting routing information for telephone calls, the method further comprising the steps:

processing application data format requests received from a data access point, by an adjunct processor;

the data access points responding with application data format records derived from the adjunct processor;

storing records responsive to the requests;

providing bi-directional data communication between the single concentration point and the adjunct processors;

requesting retransmission of stored records by the single concentration point, in a first direction; and connecting the retransmitted records to the single concentration point, in a second direction.

17. The method set forth in claim 14 wherein the method further comprises the steps:

capturing operator service records and billing data records; and matching elements of the respective records, from a particular phone call.

* * * * *